United States Patent [19]
Schaefer et al.

[11] Patent Number: 5,622,470
[45] Date of Patent: Apr. 22, 1997

[54] METHOD AND APPARATUS FOR ADAPTIVE CARTRIDGE RETRIEVAL AND INSERTION IN A STORAGE LIBRARY SUBSYSTEM

[75] Inventors: Robert J. Schaefer, Boulder; Thomas P. Jackson, Broomfield; Stephen W. Graeber, Louisville; Richard E. Sills, Longmont, all of Colo.

[73] Assignee: Breece Hill Technologies, Inc., Boulder, Colo.

[21] Appl. No.: 430,586

[22] Filed: Apr. 28, 1995

[51] Int. Cl.$^6$ .................................................. B65G 1/12
[52] U.S. Cl. .......................... 414/786; 414/275; 414/280; 414/331
[58] Field of Search .................................... 414/786, 273, 414/275, 280, 331, 787; 901/6, 33; 360/92, 98.05; 369/33–37

[56] References Cited

U.S. PATENT DOCUMENTS

| | | | |
|---|---|---|---|
| 3,943,343 | 3/1976 | Irie | 235/151.11 |
| 4,039,785 | 8/1977 | Ziemann | 414/273 X |
| 4,844,679 | 7/1989 | Teranishi | 414/273 X |
| 4,846,619 | 7/1989 | Crabtree et al. | 414/273 |
| 4,908,777 | 3/1990 | Wolfe | 364/513 |
| 4,981,409 | 1/1991 | Hirose et al. | 414/273 X |
| 4,984,106 | 1/1991 | Herger et al. | 414/273 X |
| 5,040,159 | 8/1991 | Oliver et al. | 369/34 |
| 5,102,280 | 4/1992 | Poduje et al. | 414/225 |
| 5,134,600 | 7/1992 | Oliver et al. | 369/34 |
| 5,143,193 | 9/1992 | Geraci | 414/273 X |
| 5,164,928 | 11/1992 | Oliver et al. | 414/275 X |
| 5,231,552 | 7/1993 | Schneider et al. | 360/92 |
| 5,235,474 | 8/1993 | Searle | 414/273 X |
| 5,303,034 | 4/1994 | Carmichael et al. | 356/375 |
| 5,321,353 | 6/1994 | Furness | 318/568.11 |
| 5,323,327 | 6/1994 | Carmichael et al. | 364/478 |
| 5,429,470 | 7/1995 | Nicol et al. | 414/273 X |

Primary Examiner—David A. Bucci
Attorney, Agent, or Firm—Daniel N. Fishman

[57] ABSTRACT

A method and associated apparatus within a storage library subsystem for simply adapting the motion of a robotic mechanism for moving media cartridges to allow for mechanical misalignments. When retracting a cartridge from a slot in the library subsystem, the present invention monitors a sensor in the gripper hand to verify that the cartridge is not being pulled from the gripper due to "snagging" caused by mechanical misalignment of the had with the slot. When a snag is sensed, the methods and apparatus of the present invention stop the motion, initiate robotic actions to regroup the cartridge securely, and retry the retraction with adjustments to the robotic movements and positions to avoid the snag. When inserting a cartridge into a slot in the library subsystem, the present invention monitors the progress of the servo motor controlling the robot to determine whether the motion is blocked due to mechanical misalignment of the robotic mechanism with the slot. If the robot is blocked from moving to a desired position, then the methods and apparatus of the present invention retries the insert operation with horizontal and/or vertical offsets of the robotic mechanisms to adjust for the mechanical misalignment. When retraction or insertion adjustments result in a successful operation, the adjustments are recorded in a memory for use in future insert or retraction operations.

21 Claims, 13 Drawing Sheets

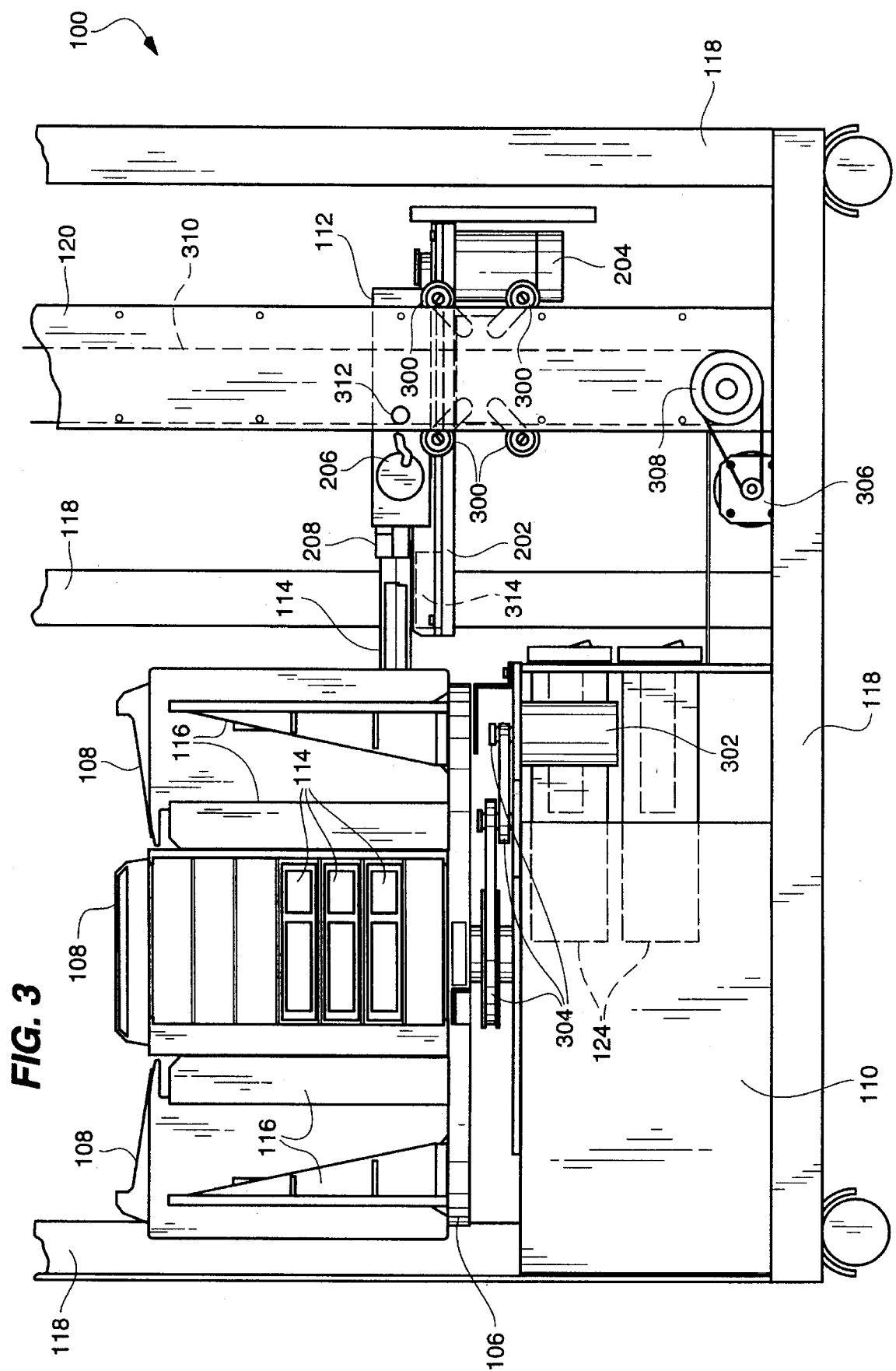

METHOD AND APPARATUS FOR ADAPTIVE CARTRIDGE RETRIEVAL AND INSERTION IN A STORAGE LIBRARY SUBSYSTEM

FIELD OF THE INVENTION

The present invention relates to storage library subsystems as commonly used in the computer data storage arts, and in particular, to a method and apparatus for adapting the robotic retrieval and insertion of storage media cartridges in the storage library subsystem to adjust for mechanical tolerances.

PROBLEM

Storage library subsystems provide large capacity secondary storage to modern computing environments. Such storage library subsystems typically employ robotic control mechanisms to physically manage media cartridges used by host computers system. A plurality of media cartridges are stored within the storage library subsystem. Each media cartridge is in a particular slot in the library subsystem. Each slot is identifiable by its physical position in the library subsystem. Each cartridge is typically uniquely identified by a machine readable label. The subsystem maintains inventory information to associate a particular media cartridge with a particular slot in the subsystem. Responsive to a host computer system request, an appropriate media cartridge is physically retrieved from its associated slot in the library, moved to an appropriate read/write device for processing, and inserted into that device. Conversely, when the use of the media cartridge is complete, the media cartridge is retrieved by the robotic mechanisms from the read/write device, moved adjacent its associated slot according the inventory maintained by the subsystem, and inserted into the storage slot of the library ready for future use in response to another host computer system request.

Prior storage library subsystems were often costly, complex, and bulky, potentially appropriate for centralized large data processing environments, but inappropriate in the more modern decentralized workgroup environments. Computing environments have tended to become smaller ("downsized") and less centralized. In these decentralized computing environments, reduced, costs, complexity, and size of storage libraries are essential elements.

Mechanical problems can arise in such storage library subsystems when retrieving a cartridge from a slot or read/write device or when inserting a cartridge into a slot or read/write device. For example, if the robotic mechanisms attempt to insert a media cartridge into a slot, but the slot is misaligned in some manner, the robotic mechanism may be unable to successfully insert the media cartridge into the slot. In typical larger library subsystems, common to prior designs, frequency of such problems is minimized by precise manufacturing tolerances. Such precise manufacturing tolerances add cost and complexity to the storage library.

To increase overall capacity without increasing physical size of the library subsystem, many storage libraries use removable storage holders or magazines in which a plurality of media cartridges may be held. Schneider et al., in U.S. Pat. No. 5,231,552 (issued Jul. 27, 1993), disclose a typical removable magazine for use in such storage library subsystems. This increases the overall storage capacity by permitting the user to store additional magazines external to the library subsystem (offline from robotic access by the library). When a externally stored magazine is required, the user removes a magazine from the storage library and substitutes the desired magazine into the library subsystem. This feature of removability tends to exacerbate the mechanical tolerance problems identified above. A magazine may be unintentionally, manually inserted into the library subsystem somewhat askew from a nominal position. This skewed position may cause mechanical misalignment of the robotic mechanisms and the storage slots in the magazine. Though this misalignment may be reduced by mechanical components which force the magazine to be better seated, such mechanisms increase the costs and complexity of the storage library subsystem.

One approach to resolving these problems could be to physically sense the precise physical position of each slot or magazine to adjust the robotic mechanism for mechanical misalignments of each slot or magazine. Physical sensing could be performed mechanically or optically. Such a solution would dramatically increase the costs and complexities of the library subsystem.

From the above discussion, it is evident that there is a need for a simple, low cost method and apparatus to quickly sense mechanical misalignments and to adapt the robotic control mechanisms to the mechanical misalignments.

SOLUTION

The present invention solves the above problems and thereby advances the art by providing simpler methods and corresponding apparatus to adapt the robotic control mechanism to mechanical misalignments of the library storage slots and magazines. The present invention comprises a method for utilizing the servo controller associated with a robotic manipulator of media cartridges to sense when a cartridge insert or retract operation has failed due, possibly, to mechanical misalignment of the robotic manipulator relative to the slot holding the media cartridge. When a failure is sensed, the control methods of the present invention attempt to resolve the failure by adjustment movements of the robotic manipulator through various retry positions. If the additional movements result in success of the media cartridge insertion or retraction operation, then the direction and magnitude of the additional movements which resulted in success of the operation are noted as adjustments to the position of the slot. These adjustments are recorded in a memory associated with the control apparatus which performs the robotic control methods. Future requests for manipulation of the media cartridge associated with a particular slot cause the control apparatus to apply the stored adjustment values to adjust the robotic mechanisms for previously sensed misalignment of that slot or magazine.

Specifically, the robotic manipulator of the storage library of the present invention is a gripper hand which is moveable vertically (Y-axis) to align with any one of a plurality of slots for holding media cartridges or any one of a plurality of read/write electronic devices which are vertically aligned in a column. The gripper hand is moved vertically in the Y-axis, along a vertically oriented Y-axis support, by a digitally controlled DC servo motor. When vertically positioned in vertical alignment with the desired slot or electronic read/write device, the gripper hand is extended forward (away from, and perpendicular to the Y-axis support) or retracted backward (toward the Y-axis support) by a second digitally controlled DC servo motor. A plurality of magazines having slots adapted to hold media cartridges are positioned around the outer circumference of a rotatable carousel. The carousel is driven to rotate about an axis parallel to the Y-axis support by a third digitally controlled DC servo motor. Solenoid actuators are used to control gripper jaws of the gripper hand. The jaws are spring biased in a closed position in which the jaws are forced toward one another to grip a cartridge between the jaws. The jaws are forced to an open position (with the jaws spread to an wider separation apart from one another) by actuation of the solenoids.

The control apparatus of the library subsystem controls the DC servo motors to move the gripper hand or the rotatable carousel to permit the gripper hand to be aligned with any slot in the library subsystem. By extending and retracting the gripper hand in combination with actuation of the solenoids, the control apparatus of the present invention can controllably grip and release a media cartridge for purposes of moving the cartridge within the library subsystem. The control apparatus of the library subsystem also receives sense information from the digitally controlled DC servo motors. The current position of the servo positioning motors is available for reading by the control apparatus. The control apparatus issues commands to the servo motor to instruct it to move to a desired position. If the control apparatus senses, by monitoring the present position sense information, that the motor has ceased progressing toward the desired position, then the control apparatus determines that the desired motion has failed due, perhaps, to a mechanical misalignment of the gripper hand with the desired slot.

If the control apparatus senses a failure on a cartridge insert operation, then the control apparatus retries the insert operation with vertical offsets by moving the gripper hand up or down on the Y-axis, with horizontal offsets by rotating the carousel clockwise of counterclockwise, and with combinations of horizontal and vertical offsets. These offset positions attempt to insert the cartridge with adaptations for mechanical misalignments. If any of the adjustment movements result in a successful insert operation, then the adjustment values which resulted in the successful insert are stored in a memory associated with the control apparatus for use in future insert operation for that slot. Later insert operations will first find the adjustment values in the memory before attempting an insert operation and apply the adjustment values to the robotic positioning commands to the servo motors.

If the control apparatus senses a failure on a cartridge retrieve operation, then the control apparatus retries the retrieve operation until successful or until, after a predetermined retry limit, the slot or cartridge is marked as unavailable. A mechanical sensor indicates that the cartridge is present between the jaws of the gripper hand. When retracting a cartridge from a slot in a magazine, the control apparatus monitors the state of the mechanical sensor to determine whether the cartridge is being pulled away from the gripper jaws. Such a condition is indicative of a "snag" in the retraction motion of the media cartridge. Depending upon the position along the Z-axis where the snag is sensed, the control apparatus may retry the retraction operation with vertical offsets by moving the gripper hand up or down on the Y-axis, with horizontal offsets by rotating the carousel clockwise of counterclockwise, and with combinations of horizontal and vertical offsets. These offset positions attempt to clear the cartridge retraction path from obstructions due, possibly, to mechanical misalignments. If any of the adjustment movements result in a successful retraction operation, then the adjustment values which resulted in the successful retraction are stored in a memory associated with the control apparatus for use in future retraction operations for cartridges in that slot. Later retract operations will first find the adjustment values in the memory before attempting a retraction operation and apply the adjustment values to the robotic positioning commands to the servo motors.

These methods and associated apparatus of the present invention for cartridge insertion and retraction within the library subsystem permit simple adaptation of the robotic movements within the library to adjust for mechanical misalignments of the cartridge slots and the robotic mechanisms. Simple adaptation of the robotic movements permits lower manufacturing tolerances to thereby reduce the costs and complexities of manufacture of the library subsystem. In addition, adjustments to the robotic movements within the library enable simple adaptation to mechanical tolerances required due to human intervention in the removal and insertion of storage magazines in the library. Numerous other advantages and features of the present invention will become apparent from the following description when read in conjunction with the accompanying drawings.

BRIEF DESCRIPTION OF THE DRAWINGS

FIG. 3 shows a side cut view of the storage library subsystem show in FIG. 1 with its outer covers removed;

DETAILED DESCRIPTION OF THE INVENTION

Figure 1:
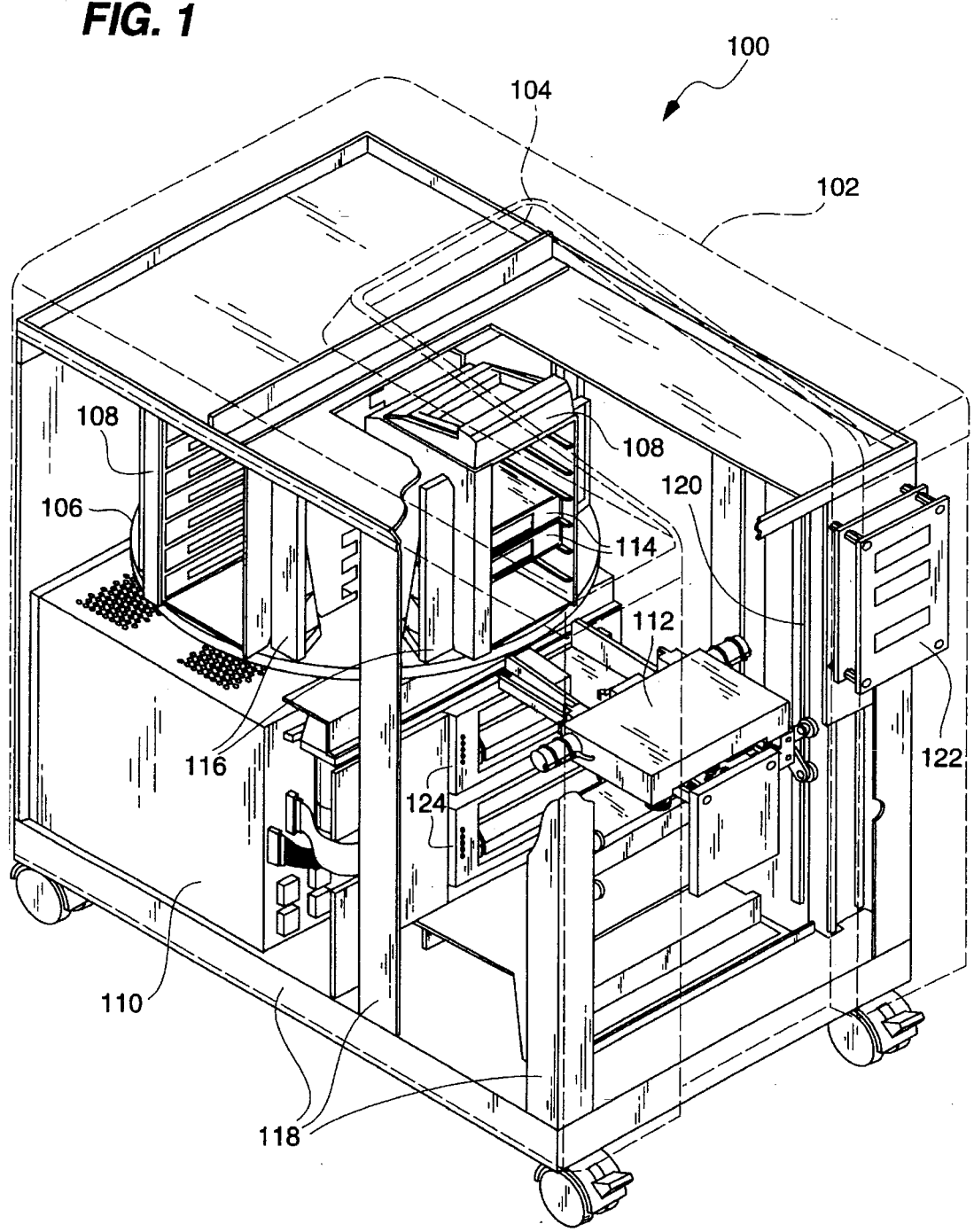
FIG. 1 shows a perspective cut away view of a storage library subsystem which employs the methods and associated apparatus of the present invention.

LIBRARY SUBSYSTEM OVERVIEW:

FIG. 1 depicts a storage library subsystem 100 which embodies the methods and apparatus of the present invention. Storage library subsystem 100 is enclosed by covers 102. Access port 104 permits operator access to the media cartridges in subsystem 100 through covers 102. Within covers 102, structural members 118 form a frame to which components of subsystem 100 are attached. Operator panel 122 provides operator interaction for user manual control of subsystem 100. Rotatable carousel 106 within subsystem 100, holds a plurality of removable magazines 108. Magazines 108 are positioned and supported on carousel 106 by magazine supports 116. Each magazine 108 is adapted to hold a plurality of media cartridges 114. Each cartridge is placed within a slot of the magazine 108. A magazine 108 positioned under access port 104 may be removed by an operator by opening a sliding door (not shown) covering access port 104, and lifting magazine 108 vertically upward and out of library 100. Conversely, an operator may insert a new magazine 108 into library 100 through access port 104. The inserted magazine 108 is mated with, and positioned by, magazine supports 116 on carousel 106. When the sliding door (not shown) covering access port 104 is again closed, library subsystem 100 may manipulate cartridges 114 held in any slot of any magazine 108 on carousel 106. Schneider et al., in U.S. Pat. No. 5,231,552 issued Jul. 27, 1993, discloses a magazine for holding media cartridges useful in storage library subsystem 100. The magazine disclosed by Schneider et al. includes means associated with each slot in the magazine for retaining a media cartridge within the slot. The retention means are actuated to retain or release the associated cartridge by a spring loaded mechanism when the cartridges is pushed deeper into the slot.

Electronic read/write devices 124 are capable of storing and retrieving information on media cartridges 114. Robotic mechanisms within storage library subsystem 100 move media cartridges 114 from slots in a magazine 108 to and from read/write electronic devices 124. Control electronics 110 control and sense the movement of the robotic mechanisms within storage library subsystem 100. Control electronics 110 further provide interface electronics for exchanging command and data with attached host computer systems (not shown). In response to a host computer system request, control electronics 110 actuates the robotic mechanisms to retrieve a requested media cartridge 114 from the magazine 108 in which it is held, move the media cartridge 114 to electronic read/write device 124, and insert the media cartridge 114 into the read/write device 124 for further processing. When the requested processing has completed, control electronics 110 actuates the robotic mechanisms to retrieve the media cartridge 114 from electronic read/write device 124 in which it was previously inserted, and returns the media cartridge 114 to the slot in magazine 108 where it was previously held. Control electronics 110 maintains in an associated memory device an inventory of the location by slot and magazine of each media cartridge 114 within storage library subsystem 100.

Robotic mechanisms of library 100 comprise gripper hand 112 and rotatable carousel 106. Gripper hand 112 is controllably movable by control electronics 110 vertically up and down on Y axis support 120. Rotatable carousel 106 is controllably rotated by control electronics 110 to position one of the plurality of magazines 108 to be aligned with Y-axis support 120. Gripper hand 112 may also be extended forward (toward magazine 108) or retracted backward (away from magazine 108) by control electronics 110. The extension and retraction motion of gripper hand 112 is referred to as "Z-axis" motion. Solenoids 206 (of FIG. 2) are used by control electronics 110 to actuate the grip and release of a media cartridge 114 between gripper jaws 208 of FIG. 2. By combining gripper hand Z-axis motion, vertical motion of the gripper hand on Y-axis support 120, solenoid grip and release, and rotation of carousel 106, control electronics 110 may move any requested cartridge 114 from a slot in a magazine 108 to a read/write device 124 or from a read/write device 124 back to a slot in a magazine 108.

FIG. 3 shows storage library subsystem 100 from a side view with covers 102 removed to reveal additional detail of the robotic mechanisms within. Rotatable carousel 106 is controllably rotated by control electronics 110 by use of digitally controlled DC servo motor 302 and transmission assembly 304. By actuating DC servo motor 302 in a first direction, control electronics 110 controllably rotates carousel 106 in a clockwise direction. By actuation of DC servo motor 302 in the opposite direction, carousel 106 is rotated counterclockwise. Gripper hand 112 is controllably moved vertically up and down on Y-axis support 120 by control electronics 110 use of digitally controlled DC servo motor 306, transmission assembly 308, and driving belt 310. Gripper hand 112 is attached to belt 310 at joint 312. By activating DC servo motor 306 in a first direction, gripper hand 112 can be moved vertically upward on Y-axis support 120. By controllably rotating DC servo motor 306 in an opposite direction, gripper hand 112 can be moved vertically downward on Y-axis support 120. Rollers 300 attached to gripper hand 112 secure the gripper hand to Y-axis support 120 and permit the gripper hand 112 to slide vertically up and down on the support. DC servo motor 204 is controllably activated by control electronics 110, to extend gripper hand 112 forward on its Z-axis (leftward in FIG. 3) toward magazine 108, and controllably activated to retract gripper hand 112 rearward on its Z-axis (rightward in FIG. 3) away from magazine 108. Gripper hand 112 slides on Z-axis rail 202 as it is extended forward and retracted rearward by activation of DC servo motor 204. Gripper jaws 208 are opened by activation of solenoids 206 and closed by deactivation of solenoids 206 to grip or release a media cartridge 114.

As shown in FIG. 3, gripper hand 112 is gripping a cartridge 114 between gripper jaws 208. The media cartridge 114 has been partially retracted rearward to remove the media cartridge 114 from magazine 108. Laser/optical sensor unit 314, is positioned toward the front of gripper hand 112, and is used to calibrate the positioning of gripper hand 112 relative to carousel 106 and slots in magazines 108.

Figure 2:
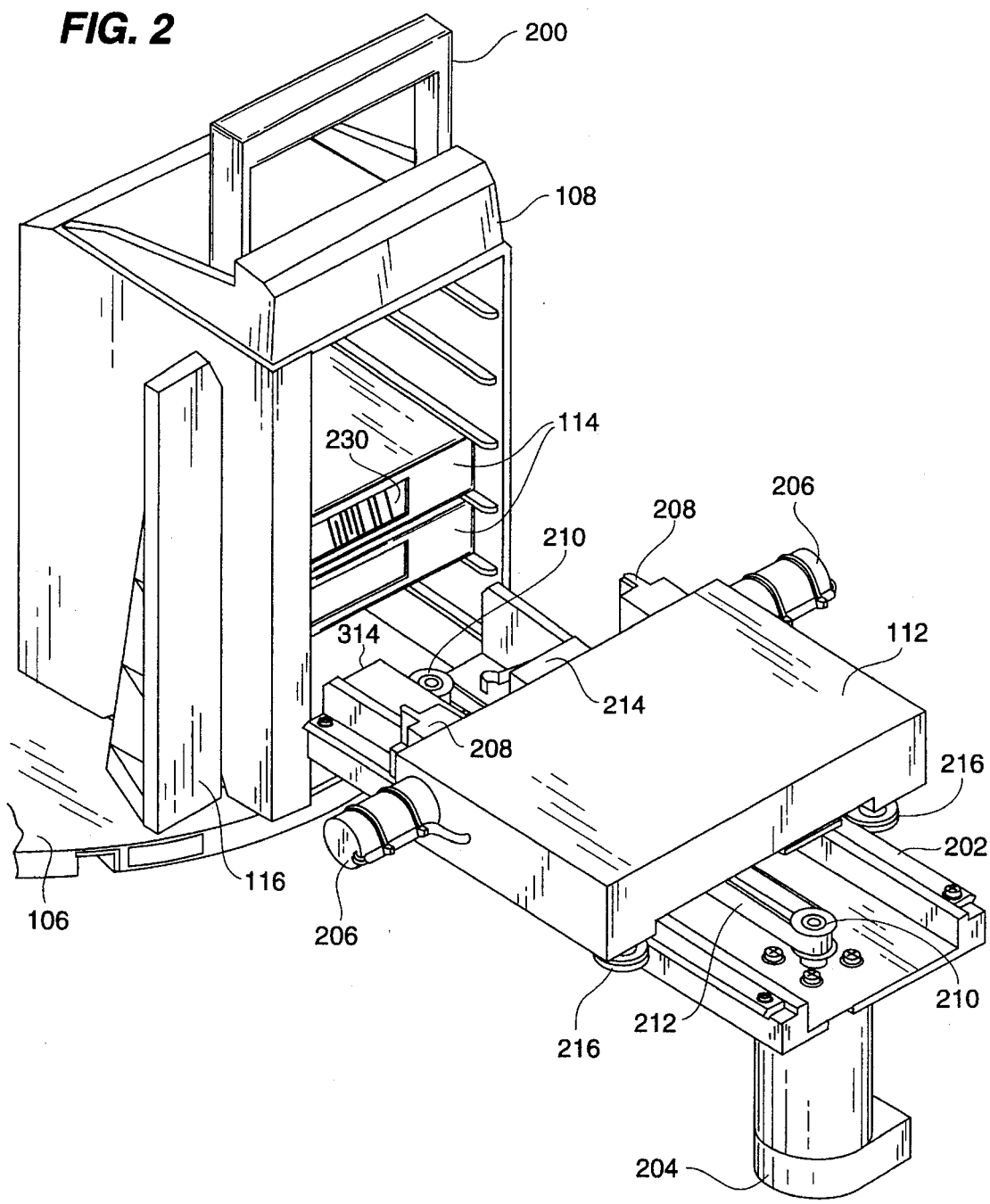
FIG. 2 shows a perspective view of the details of the gripper hand and its relationship to media cartridges in a magazine within the storage library subsystem shown in FIG. 1.

FIG. 2 shows a perspective view with additional detail of gripper hand 112 as it relates to magazine 108 inserted and supported within guides 116 on carousel 106. Gripper hand 112 is adapted to slide forward and backward on Z-axis rail 202. Rollers 216 secure gripper hand 112 to Z-axis rail 202 and permit gripper hand 112 to slide on rail 202. DC servo motor 204 turns pulley 210, which in turn drives belt 212. Gripper hand 112 is affixed to a position on belt 212 (not shown) such that when servo motor 204 is actuated to turn in one direction will move gripper hand 112 forward, and when turned in the opposite direction will move gripper hand 112 rearward. Gripper jaws 208 are spring biased to maintain a closed position, squeezed toward one another when solenoids 206 are inactive. When solenoids 206 are activated by control electronics 110, gripper jaws 208 are driven apart from one another to an open position. In the open position, a media cartridge 114 may be inserted between gripper jaws 208. In the closed position, gripper jaws 208 hold a media cartridge 114 between the jaws.

When retrieving or inserting a media cartridge 114 into a particular slot of a magazine 108, gripper hand 112 is moved vertically up or down on the Y-axis support, such that the top edge of Z-axis rail 202 is aligned just below the bottom edge of the cartridge 114 to be manipulated (either retracted or inserted). When control electronics 110 inserts a cartridge 114 into magazine 108, gripper hand 112 is moved forward by activation of DC servo motor 204. When retracting a media cartridge 114, control electronics 110 moves gripper hand 112 rearward by activation of DC servo motor 204 in the opposite direction. Furthermore, control electronics 110 activates and deactivates solenoids 206 to open or close jaws 208 to thereby release or grip a cartridge 114.

In response to a request received from an attached host computer system, control electronics 110 of library subsystem 100 moves robotic gripper hand 112 vertically up or down on Y-axis support 120 to align gripper hand 112 with an appropriate slot in a magazine 108 containing a requested cartridge 114. In addition, control electronics 110 rotates rotatable carousel 106 to align the desired magazine 108 with the gripper hand 112. The gripper hand 112 is controlled to retrieve a cartridge 114 from a desired slot in magazine 108, or to return a cartridge 114 into a desired slot.

Figure 12:
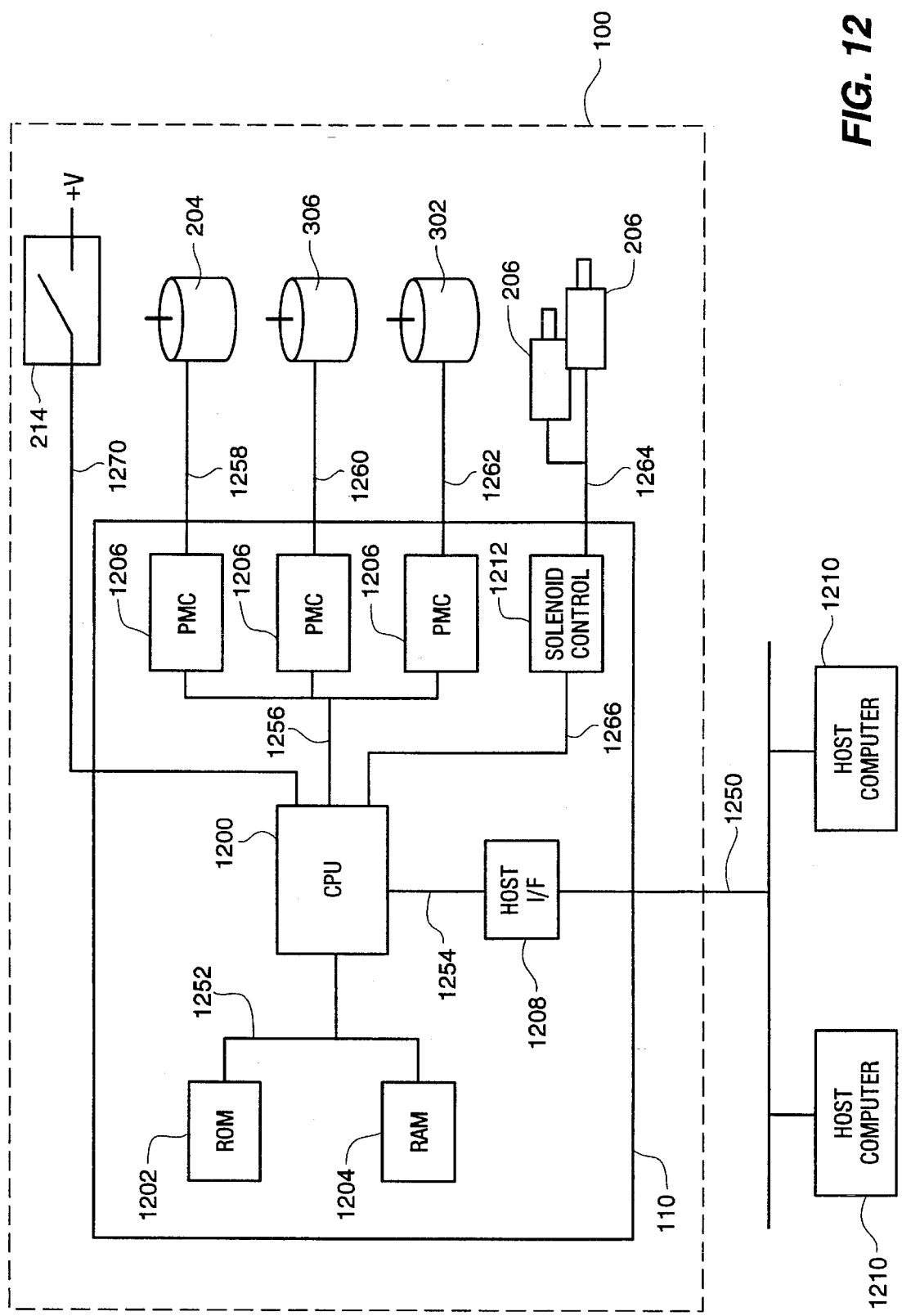
FIG. 12 is a diagram of control apparatus which operates the methods of the present invention.

FIG. 12 shows additional detail of control electronics 110 which performs the methods of the present invention to control the robotic gripper hand 112 and carousel 106 of the storage library 100. Control electronics 110 comprises a CPU 1200 which executes programmed instructions for the methods of the present invention fetched from ROM 1202 over memory bus 1252. CPU 1200 exchanges data with RAM 1204 also over memory bus 1252. Data stored in RAM 1204 includes control variables relating to control of the robotic mechanisms of the library 100 as well as host computer 1210 related communication variables and buffers. CPU 1200 exchanges, information (including commands, status and data) with one or more host computer systems 1210 via bus 1254 and host I/F controller 1208. Host I/F controller 1208 converts information exchanged with CPU 1200 over bus 1254 into signals and protocols applicable to host communications bus 1250. Host communications bus 1250 may be any of several well known peripheral interface standards including local area network (LAN) connections, or, in the preferred embodiment of the present invention, SCSI.

CPU 1200 exchanges command and status information with each of three precision motion controllers 1206 over bus 1256. Precision motion controllers (PMC) 1206 are any of several standard motion controller integrated circuits used for the control of servo motors. In the preferred embodiment of the present invention, a National Semiconductor LM628 or LM629 is used for each of three PMCs 1206. One of ordinary skill in the art will recognize many equivalent controller circuits which are capable of controlling servo motors on behalf of CPU 1200 and providing status information back to the CPU 1200. A first PMC 1206 controls DC servo motor 204 over bus 1258 to extend and retract the gripper hand 112. A second PMC 1206 controls Y-axis DC servo motor 306 over bus 1260 to move the gripper hand 112 up and down on Y-axis support 120. The third PMC 1206 rotates carousel 106 by applying signals over bus 1262 to servo motor 302. CPU 1200 applies signals over bus 1266 to solenoid controller 1212 which, in turn, activates and deactivates solenoids 206 to open and close gripper jaws 208. CPU 1200 senses the state of switch 214 over signal path 1270.

CPU 1200 combines motions of the robotic mechanisms, exchanging information with PMCs 1206 to control DC servo motors 204, 302, and 306, and activation and deactivation of solenoids 206 through solenoid controller 1212, to grip, release, and move media cartridges 114 within library 100.

Figure 4A:
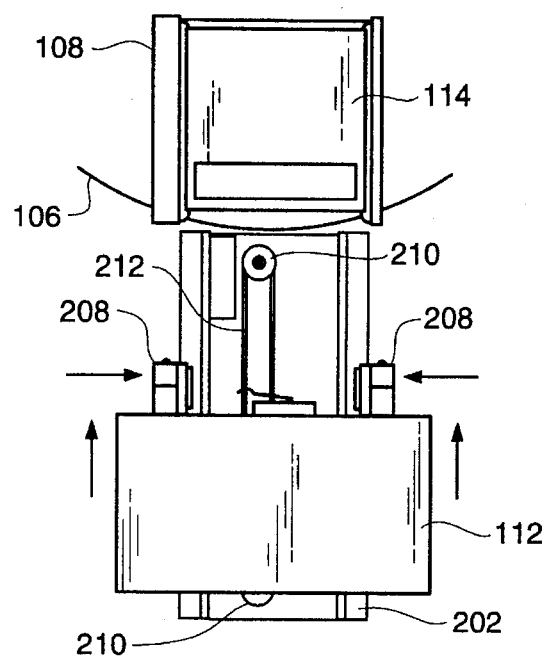
FIGS. 4A–4E show a simplified top view of the gripper hand of FIG. 1 in a sequence of moves retracting a media cartridge from its slot in a magazine.
Figure 4B:
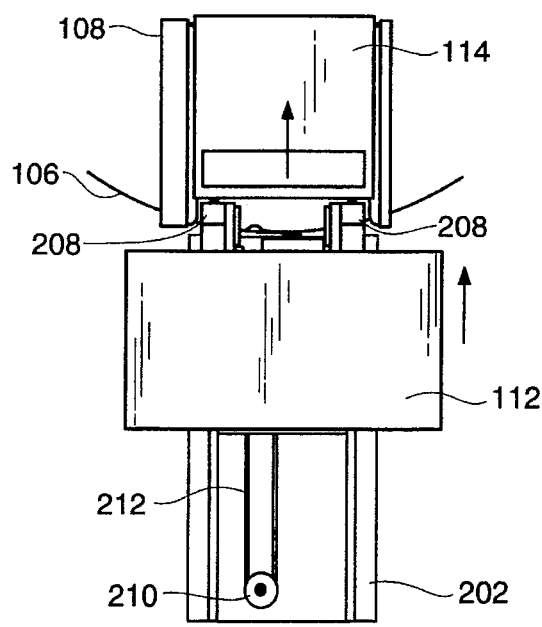
Figure 4C:
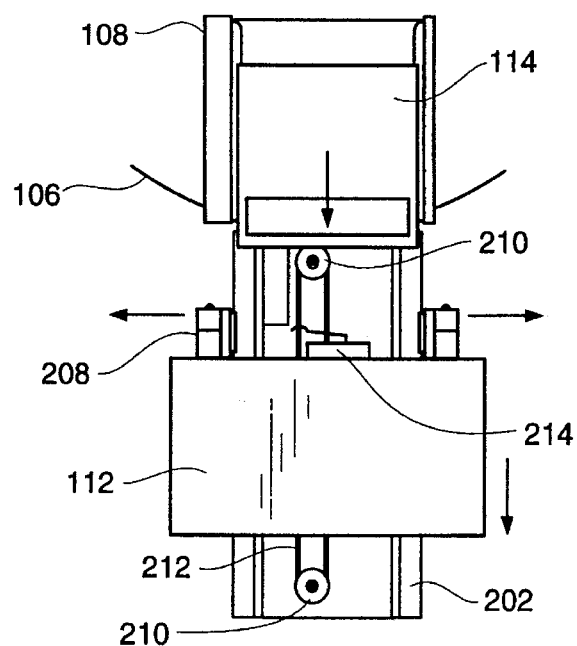
Figure 4D:
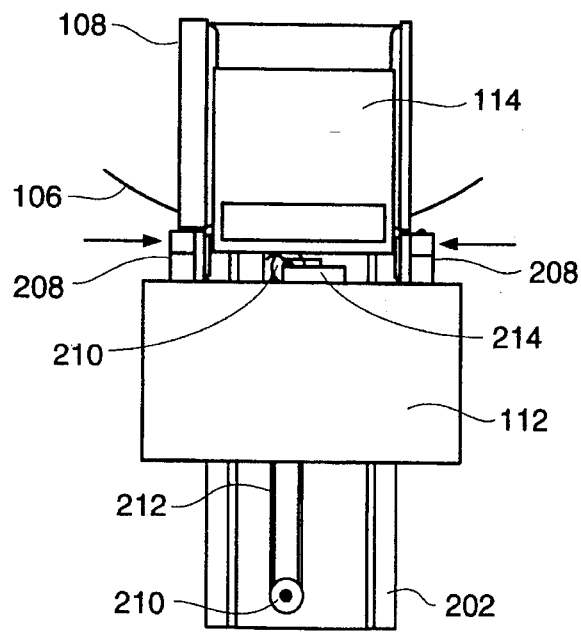
Figure 4E:
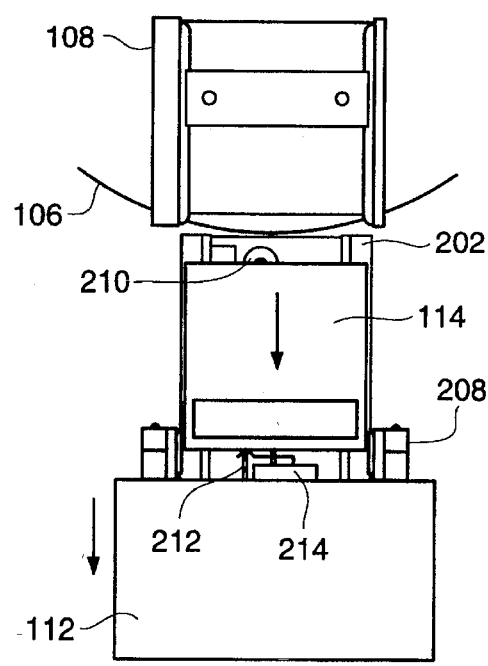

CARTRIDGE RETRACTION OPERATIONS AND ADAPTATION:

FIGS. 4A through 4E depict from a top view the control and motion of gripper hand 112 to retract a desired media cartridge 114 from a slot in a magazine 108. Preliminary positioning of the gripper hand 112 vertically on the Y-axis support 120 of FIG. 1, and rotation of rotatable carousel 106 to align a desired magazine 108 with gripper hand 112, are performed prior to the status depicted in FIG. 4A. In FIG. 4A, the first step for retracting a desired cartridge 114 is to deactivate solenoids 206 to permit gripper jaws 208 to be drawn toward one another in a closed position by the spring biased tension applied thereto. In addition, gripper hand 112 is moved forward, sliding on Z-axis rail 202, by activation of DC servo motor 204. The direction of motion of gripper hand 112, and of gripper jaws 208, are indicated in FIGS. 4A through 4E by the arrows associated therewith. FIG. 4B depicts the status following the motion initiated in FIG. 4A. Gripper hand 112 has moved forward with gripper jaws 208 in a closed position. Gripper jaws 208 in the closed position as shown in FIG. 4B serve to depress cartridge 114 within its slot of magazine 108. This motion releases cartridge 114 from the retention mechanism within a slot of magazine 108. Details of operation of retention mechanisms within magazine 108 are discussed in detail in Schneider et al. (supra.). FIG. 4C shows the next motion of the robotic mechanism in releasing cartridge 114 from its retention mechanism in magazine 108. By retracting gripper hand 112 rearward from magazine 108, cartridge 114 is permitted to slide out of its retention mechanism in magazine 108. FIG. 4C depicts gripper jaws 208 being forced apart to an open position by activation of solenoids 206. This open position of jaws 208 is in preparation for moving gripper hand 112 forward to grip the released cartridge 114. FIG. 4D next shows gripper hand 112 moved forward toward magazine 108 with gripper jaws 208 opened to grasp cartridge 114 therebetween. Gripper jaws 208 are then permitted to be drawn toward one another by releasing solenoids 206 and permitting spring bias tension to close gripper jaws 208 on cartridge 114. In this closed position cartridge 114 is grasped between jaws 208. FIG. 4E next depicts gripper hand 112 being retracted rearward, with gripper jaws 208 grasping cartridge 114. Cartridge 114 thereby is retracted away from its slot in magazine 108, supported below by Z-axis rail 202. One of ordinary skill will note that Z-axis rail 202 serves to support cartridge 114 to thereby reduce the gripping tension required of gripping jaws 208 to retain a grasp of cartridge 114. Rather, the weight of cartridge 114 is supported primarily by Z-axis rail 202.

Sensor switch 214 senses the presence or absence of a cartridge 114 seated between the jaws 208 of gripper hand 112. When a cartridge 114 is seated within the grasp of gripper jaws 208, the cartridge 114 mechanically closes sensor switch 214 to so signify. If the grip on cartridge 114 is wholly or partially lost then sensor switch 214 opens to indicate loss of the grasp of the cartridge 114 between gripper jaws 208. In FIG. 4D, cartridge 114 is seated within the grip of gripper jaws 208 so as to close sensor switch 214 on gripper hand 112. Closure of sensor switch 214 serves to verify that cartridge 114 is positioned within the grasp of gripper jaws 208. As the cartridge is retracted in FIG. 4E, the state of sensor switch 214 is monitored by control electronics 110 to verify that the cartridge 114 remains within the grip of gripper jaws 208. During the retraction of cartridge 114 depicted from FIG. 4D through FIG. 4E the state of sensor switch 214 is monitored. If the switch 214 opens during retraction, the retraction motion of gripper hand 112 is stopped. The switch 214 may open if the cartridge 114 "snags" on an inside wall of magazine 108 or if the cartridge 114 collides with the front edge of Z-axis rail 202 as the cartridge 114 initially exits the slot in magazine 108. Snagging or collision of the cartridge 114 may be caused by mechanical misalignment between the gripper hand 112 and the slots of the magazine 108. This snagging or collision of the cartridge 114 may cause the grip of the cartridge 114 to be lost as the gripper hand 112 continues to move while the cartridge is "snagged." When the grasp of the cartridge 114 is unintentionally lost, the retraction motion of gripper hand 112 is stopped, the grasp of the cartridge 114 between gripper jaws 208 is restored, and the retraction motion is restarted.

Figure 6:
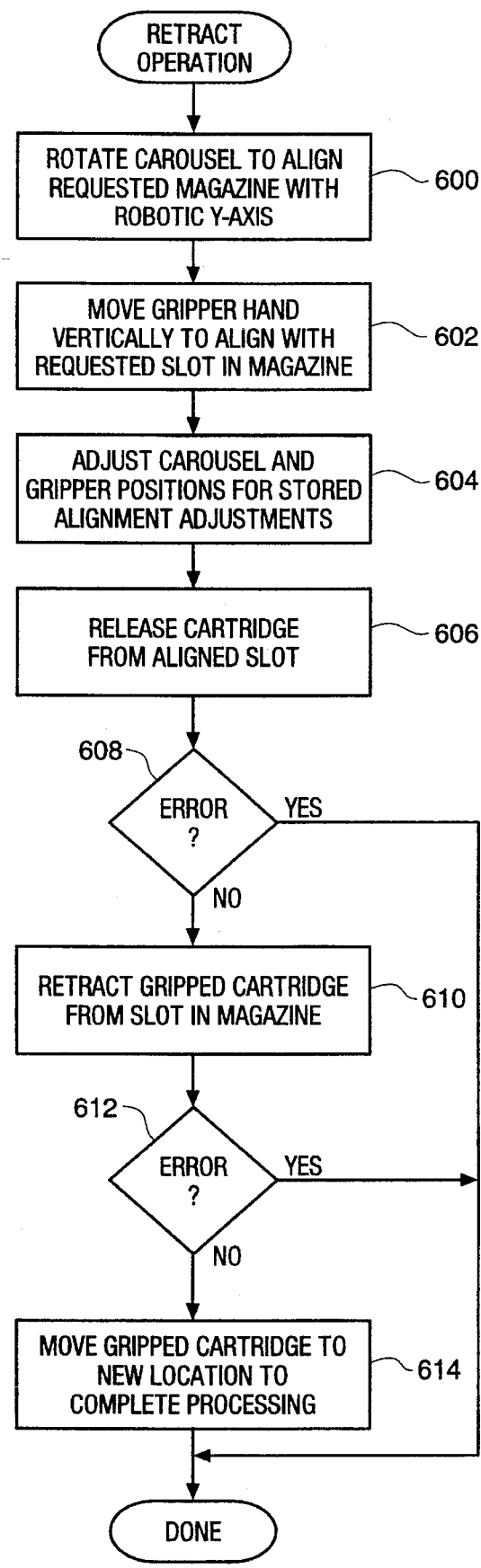
FIG. 6 is a flowchart of the media cartridge retraction operation shown in FIGS. 4A–4E.

The operations depicted in FIGS. 4A through 4E are also shown in FIG. 6 in flowchart form. FIG. 6 is a flowchart depicting the flow of control of a retract cartridge operation. Element 600 is operable to rotate carousel 106 to align a requested magazine 108 with the robotic Y-axis. This alignment of carousel 106 with the Y-axis of the robotic gripper hand 112 permits the robotic gripper hand 112 to access cartridges 114 in the slots of the aligned magazine 108. Element 602 is next operable to move gripper hand 112 vertically on Y-axis support 120 to align gripper hand 112 with a particular slot in magazine 108 containing the cartridge requested by a host computer system for retrieval. Element 604 is then operable to adjust the rotational position (theta axis) of the carousel 106 and to adjust the vertical position of gripper hand 112 for any alignment adjustments previously stored in the memory associated with control electronics 110. The operation of elements 600 through 604 serve to accurately position the gripper hand 112 for retrieval of a particular cartridge 114 in a slot of magazine 108. This nominal positioning of elements 600 and 602 is adjusted by operation of element 604 to account for any prior adjustments stored from previous retraction operation for insertion operations (as discussed below). One of ordinary skill in the art will note that elements 600, 602, and 604 may be combined and overlapped in time so that rotational motion of carousel 106 and vertical motion of gripper hand 112 may overlap. Additionally, element 604 to adjust the rotational position of carousel 106 and the vertical position of gripper hand 112 may be combined with elements 600 and 602 by simply adding the adjustment values retrieved from the memory associated with control electronics 110 into the desired nominal positions set by elements 600 and 602.

Element 606 is next operable to release the desired cartridge 114 from its slot in magazine 108 which currently aligned with the position of gripper hand 112. The cartridge 114 is released from the retention means of its slot in magazine 108 as described by Schneider, et al. (supra.). One of ordinary skill will recognize that a particular magazine design may require alternate retention release mechanisms. The magazine 108 design of Schneider; et al. (supra.) is but one choice in the design of a storage library 100. Other magazine 108 designs may require either alternate retention release procedures, or may require no retention release step. Details of the function of element 606 to release cartridge 114 from the retention means of magazine 108 are described in further detail below with reference to FIG. 8. Element 608 is operable to determine whether the functioning of Element 606 to release the cartridge 114 from the retention means of magazine 108 succeeded or failed. If the release processing of element 606 resulted in an error (a failure), then processing is completed, and the cartridge 114 can no longer be removed from the slot in magazine 108. Such an error condition may be handled by error processing well known in the art. For example, the slot may be noted in a memory data structure as defective and further requests pertaining to that slot may be rejected until the magazine is repaired or replaced. If the processing of element 606 to release cartridge 114 from the retention means of magazine 108 is successful, as determined by the testing of element 608, then processing proceeds with element 610. Element 610 is operable to retract the gripper hand 112 with cartridge 114 grasped between gripper jaws 208. Details of the operation of element 610 are described below with reference to FIG. 9. Element 612 is next operable to determine the success or failure of the retraction processing of element 610. If the processing of element 610 results in an error (a failure), as determined by the test of element 612, processing is completed and the cartridge 114 can not be removed from its slot in magazine 108. Further processing for such an error condition is a matter of design choice well known to those skilled in the art as briefly discussed above. If the retraction processing of element 10 is successful, as determined by the test of element 612, processing continues at element 614 to move the grasped cartridge 114 to a new location for further processing in response to the host computer system's request. This completes the sequence of operations to retract the cartridge from a slot in a magazine 108.

The operations described above with reference to the flowchart of FIG. 6 may be easily adapted to an analogous operation to retract a cartridge 114 from within an electronic read/write device 124. Electronic read/write device 124 is rigidly affixed within storage library 100 as distinct from magazine 108 which are manually removable from the storage library 100. Since the read/write devices 124 are rigidly positioned in the library 100, closer manufacturing tolerances are possible and therefore error conditions such as may arise in retracting a cartridge from magazine 108 are less frequent.

Figure 8:
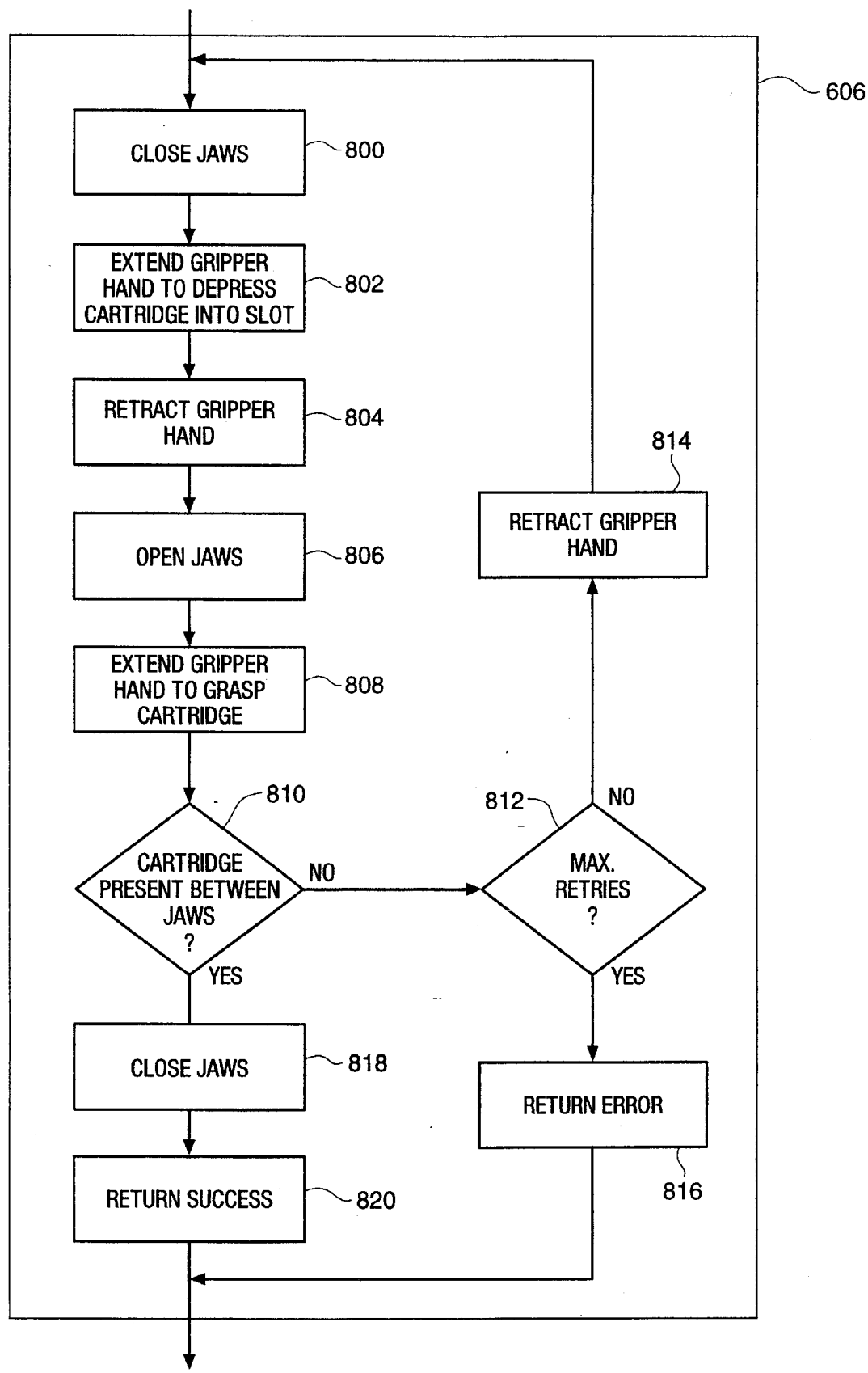
FIG. 8 is a flowchart showing additional detail of an element of the retraction operation of FIG. 6.

FIG. 8 is a flowchart depicting additional details of the operation of element 606 of FIG. 6 which releases a cartridge from the retention means of the slot in magazine 108. While gripper hand 112 is retracted away from magazine 108, element 800 is first operable to close jaws 208 by deactivating solenoids 206 (of FIG. 2). Element 802 is next operable to extend gripper hand 112 forward, toward the cartridge 114 in the slot of magazine 108. Element 804 then retracts the gripper hand 112 to permit the release of cartridge 114 from the retention means in the slot of magazine 108. After release of the retention means, cartridge 114 slides out of its slot sufficiently to be grasped by gripper hand 112.

Element 806 opens jaws 208 by activating solenoids 206 so that cartridge 114 may slide therebetween as element 808 extends gripper hand 112 forward to grasp the cartridge 114. When gripper hand 112 is extended fully forward with jaws 208 in the open position, cartridge 114 seats between the separated jaws 208 and closes switch 214 to indicate that the cartridge is present in the grasp between the open jaws 208. Element 810 tests whether sensor switch 214 indicates the presence of a cartridge between the jaws 208. If the cartridge is not sensed by closure of switch 214, then processing continues with element 812 to process the error in releasing the cartridge 114 from the retention means of the slot in magazine 108. If element 810 senses the presence of cartridge 114 between the jaws 208, processing completes with element 818 to close jaws 208 by deactivating solenoids 206 to thereby grasp the cartridge 114 between the jaws then element 820 to return success to the calling function.

If release of the retention means described above does not free the cartridge 114 from its slot in magazine 108 then element 812 is operable to determine whether a maximum number of retries has been exhausted. If the maximum number of retries have been exhausted, processing completes with element 816 returning an error status to the calling function. One of ordinary skill will recognize that many standard error recovery procedures may be utilized to resolve the error condition. For example, the slot may simply be noted as unavailable for further requests and the slot no longer used until the magazine is repaired or replaced. Additionally, one will readily recognize that any number of retries suitable to a particular environment may be used in the methods of the present invention. If additional retries may be attempted, as determined by operation of element 812, then element 814 is operable to retract gripper hand 112. Processing then continues by looping back to element 800. Elements 800 through 814 repeat until the release process is successful in releasing retention means in magazine 108, or until the maximum number of retries is exhausted.

Figure 9:
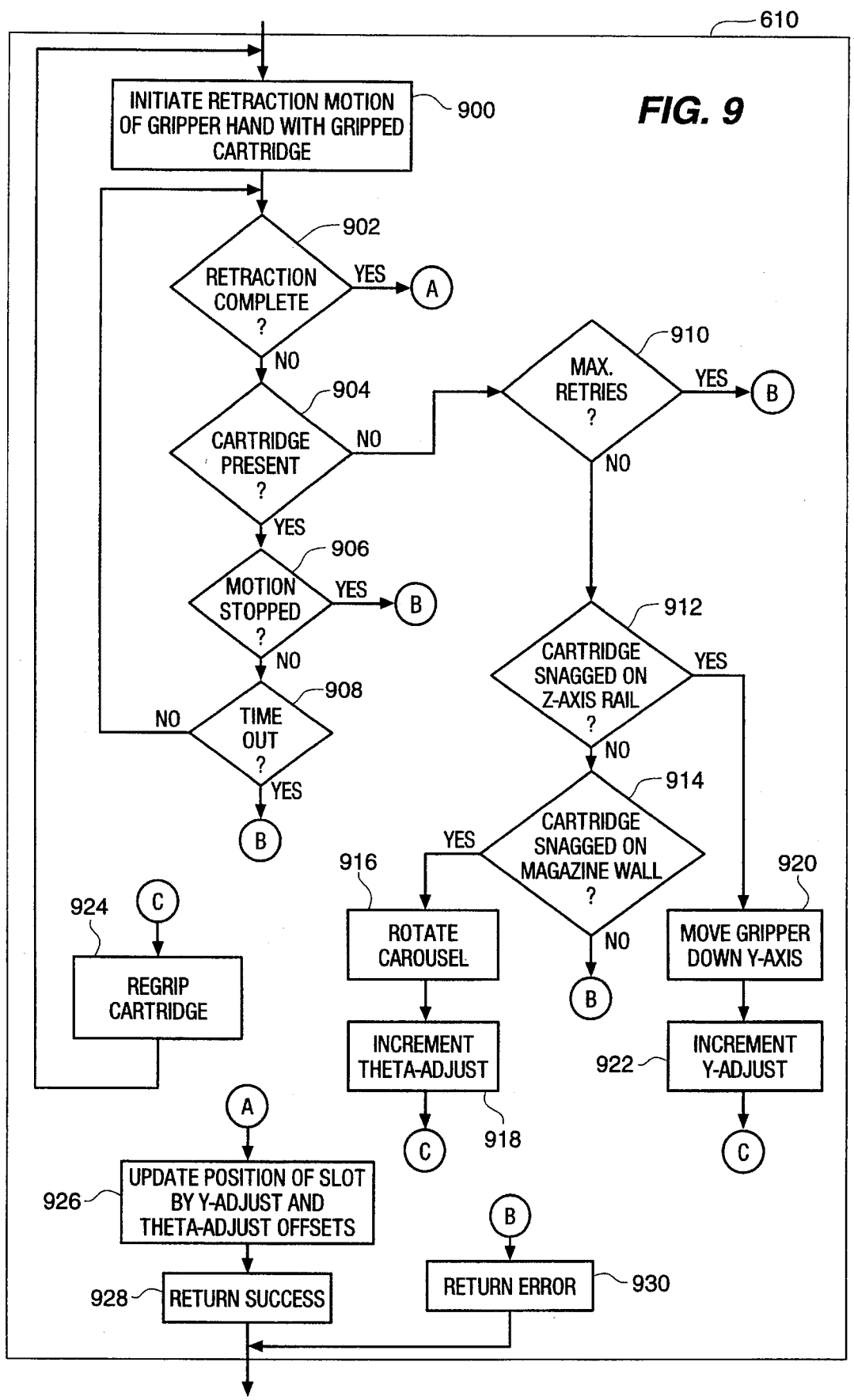
FIG. 9 is a flowchart showing additional detail of an element of the retraction operation of FIG. 6.

FIG. 9 is a flowchart providing additional detail of the operation of element 610 of FIG. 6. Element 610 is operable to retract the requested cartridge 114 from its slot in a magazine 108. Element 900 of FIG. 9 initiates the retraction motion of gripper hand 112 by activating DC servo motor 204. Once the motion of the gripper hand 112 is initiated by element 900, elements 902 through 908 repetitively test for successful completion or failure of the retraction motion. Element 902 test for successful completion of the retraction motion of gripper hand 112 by reading the status information available from DC servo motor 204. If the motion has successfully completed processing continues with element 926 to update the Y-axis adjust and theta-axis adjust values which resulted in a successful retraction of the cartridge 114. These adjust offset values are discussed below. Processing then completes with element 928 returning a success status to the calling function.

If element 902 senses that the retraction motion has not yet completed, then element 904 is next operable to verify that the cartridge 114 is still present in the grasp of gripper jaws 208 by sensing the state of switch 214. If switch 214 is open, then the cartridge has slipped out of a secure grip between gripper jaws 208. For example, the cartridge 114 may have "snagged" on the leading edge of the Z-axis tray 202 or may become caught within the walls of its slot in magazine 108. Processing then continues with element 910 discussed below.

If switch 214 remains closed, the cartridge 114 remains securely grasped between gripper jaws 208 and processing continues with element 906. Element 906 determines whether retraction motion of the gripper hand 112 with the grasped cartridge 114 has stopped. If the retraction motion has stopped, due perhaps to the blockage of the retraction travel path of gripper hand 112 on Z-axis tray 202, then processing completes with element 930 returning an error status to the calling function. As discussed above, many well known error handling functions are applicable to such an error condition.

If element 906 determines that the retraction motion is still proceeding, then element 908 is next operable to determine if the retraction motion has required too much time. If element 908 determines that the requested retraction motion is taking too much time, then a timeout error has occurred and processing continue with element 930 to return an error status, as discussed above, to the calling function.

If elements 902 through 908 determine that processing of the retraction motion is proceeding normally, then processing continues by looping back to element 902 to await successful completion of the retraction motion or a failure of the requested motion.

When element 904 detects a loss of the grasp of cartridge 114 between gripper jaws 208 as sensed by the opening of switch 214, element 910 is operable to determine if the maximum number of retry attempts has been exhausted. If the maximum number of retries has been attempted then processing completes with element 930 returning an error status to the calling function as discussed above.

Otherwise, another retry attempt is initiated with element 912 determining whether the cartridge 114 was drawn out of the gripper jaws 208 by collision with the leading edge of the Z-axis rail 202. This is determined by reading the location of the Z-axis DC servo motor 204 at the time of sensing the opening of switch 214. If the cartridge appears to have collided with the edge of the Z-axis rail 202, then elements 920 and 922 are operable to move the gripper hand 112 downward on the Y-axis support a small increment to attempt to clear the path for the cartridge 114 to retract past the leading edge of the Z-axis rail 202. Element 922 decrements the y-adjust variable to account for the downward adjustment performed by element 920. Processing then continues with element 924 discussed below.

If the cartridge does not appear to have collided with the Z-axis rail 202, then processing continues with element 914 determining whether the cartridge 114 was drawn out of the gripper jaws 208 by "snagging" the inner walls of its slot in magazine 108. This is determined by reading the location of the Z-axis DC servo motor 204 at the time of sensing the opening of switch 214. If the cartridge appears to have snagged the inner walls of its slot, then elements 916 and 918 are operable to rotate the carousel 106 a small increment to attempt to clear the path for the cartridge 114 to retract from it slot. Element 918 increments the t-adjust variable to account for the theta-axis rotational adjustment performed by element 916. Processing then continues with element 924 discussed below.

Element 924 performs movement of the gripper hand 112 as required to regroup the cartridge 114. These movements are as discussed above with respect to element 606. Processing then continues by looping back to element 900 to initiate another attempt to retract cartridge 114. Elements 900 through 924 repeat until the cartridge 114 is successfully retracted from its slot or until an error condition is returned to the calling program.

Figure 5A:
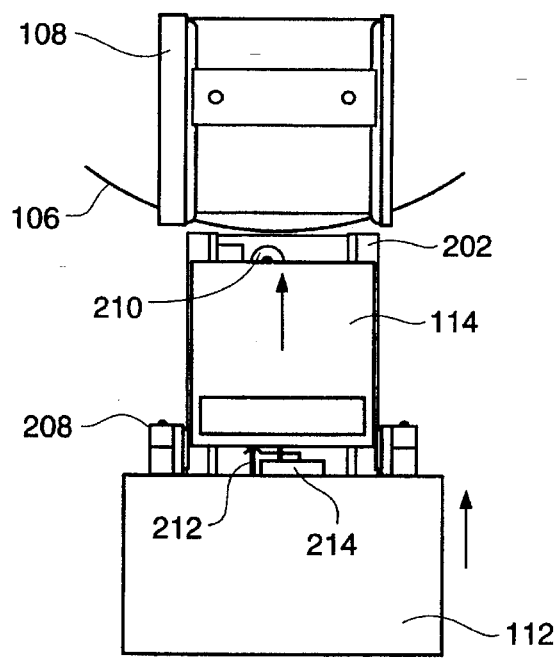
FIGS. 5A–5E show a simplified top view of the gripper hand of FIG. 1 in a sequence of moves inserting a media cartridge into its slot in a magazine.
Figure 5B:
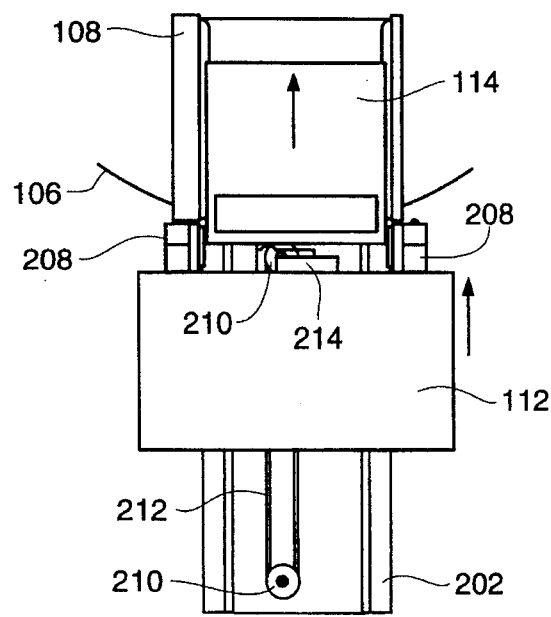
Figure 5C:
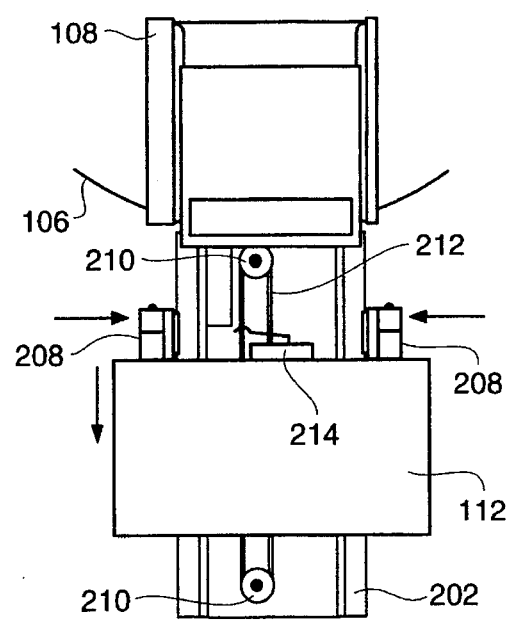

CARTRIDGE INSERTION OPERATION AND ADAPTATION:

FIGS. 5A through 5E depicts a top view of the sequence of robotic gripper hand 112 movements for inserting a cartridge 114 into a slot of a magazine 108. Prior to the state depicted in FIG. 5A, a cartridge 114 was retrieved from another location in library subsystem 100 (i.e. from an electronic read/write device 124 which has completed the processing requested by a host computer system). The retrieved cartridge 114 is grasped between opposing gripper jaws 208 and supported below on Z-axis rail 202. As shown in FIG. 5A, gripper hand 112 is extended forward (toward magazine 108) to insert the grasped cartridge 114 into the desired slot of magazine 108 currently aligned with gripper hand 112. FIG. 5B shows cartridge 114 grasped between gripper jaws 208 inserted a slot of magazine 108 to the maximum extent of forward extension of gripper hand 112. In FIG. 5C gripper jaws 208 have been separated into an open position by actuation of solenoids 206 to release the grip of cartridge 114. In addition, gripper hand 112 is partially retracted rearward (away from magazine 108. As gripper hand 112 is retracted and gripper jaws 208 are clear of cartridge 114, then gripper jaws 208 are closed by deactivating solenoids 206.

Figure 5D:
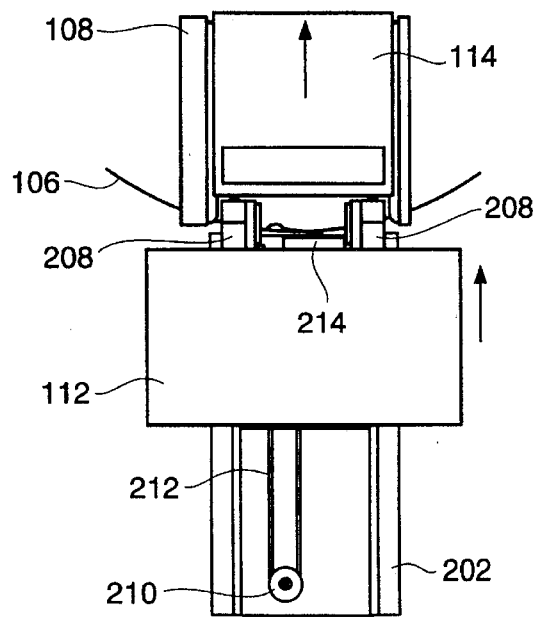
Figure 5E:
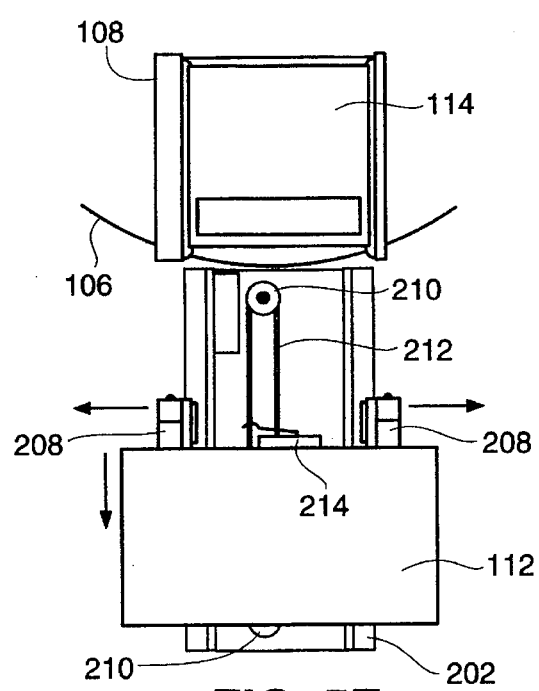

The magazine 108 as taught by Schneider et al. (supra.) requires that the cartridge 114 be seated within its slot of magazine 108 sufficiently to activate the retention means which secure the cartridge 114 within it slot. As shown in FIG. 5D, gripper hand 112 is extended forward (toward magazine 108) with gripper jaws 208 closed. The closed gripper jaws 208 serve to push cartridge 114 further into its slot to activate the retention means in the slot of magazine 108. FIG. 5E shows the final step of retracting gripper hand 112 having completed the insertion process of cartridge 114 into a slot of magazine 108.

Cartridge 114 is inserted into its slot in magazine 108 by the gripper hand 112 extension motion as depicted by the motion between FIGS. 5A and 5B. This extension motion of the gripper hand 112 may be blocked or otherwise precluded by misalignment between gripper hand 112 and the magazine 108. When the gripper hand 112 and magazine 108 are misaligned, the cartridge 114 may strike the front face of the magazine 108 blocking further travel of gripper hand 112 extending forward to insert the cartridge 114 into its slot. Control electronics 110 senses the progress of the extension motion by reading status from DC servo motor 204. The servo motor 204 status indicates that the extension motion of gripper hand 112 has stopped if there exists some blockage or impediment to successful extension of the gripper hand 112. In response to such a determination, methods of the present invention attempt to retry the insertion operation by partially retracting the gripper hand 112, adjusting the vertical position of the gripper hand 112 on Y-axis support 120 and/or the rotational position of carousel 106, then retrying the insertion process.

Figure 7:
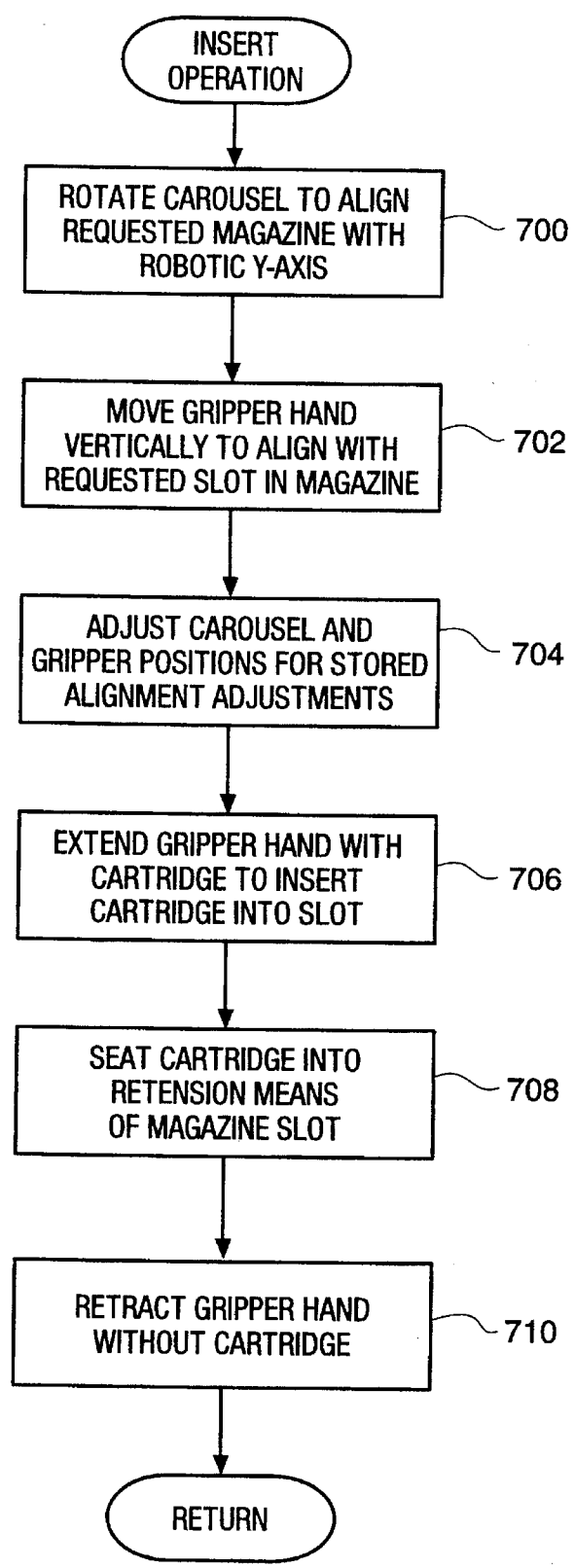
FIG. 7 is a flowchart of the media cartridge insertion operation shown in FIGS. 5A–5E.

FIG. 7 is a flowchart describing steps of the insertion operation depicted by FIGS. 5A through 5E. Elements 700 through 704 operate identically to elements 600 through 604 discussed above to rotate the carousel 106 and move the gripper hand 112 vertically to align with the desired slot of the desired magazine 108. Element 706 is then operable to extend the gripper had 112 forward (toward the magazine 108) to insert the gripped cartridge 114 into the slot currently aligned with the gripper hand 112. Detailed operation of element 706 is discussed below with respect to FIG. 10.

Element 708 is next operable to use gripper hand 112 to seat cartridge 114 within its slot so as to activate the retention means for securing the cartridge 114 in the slot. Schneider et al. (supra.) discuss the details of the retention means in magazine 108. One of ordinary skill will readily recognize that different magazine designs usable with the methods and apparatus of the present invention may require other operation to secure the cartridge 114 within a slot of a magazine. Yet other magazine designs may require no further movement by gripper hand 112 to secure the cartridge 114 within its slot. Detailed operation of element 708 is discussed below with respect to FIG. 11.

Figure 10:
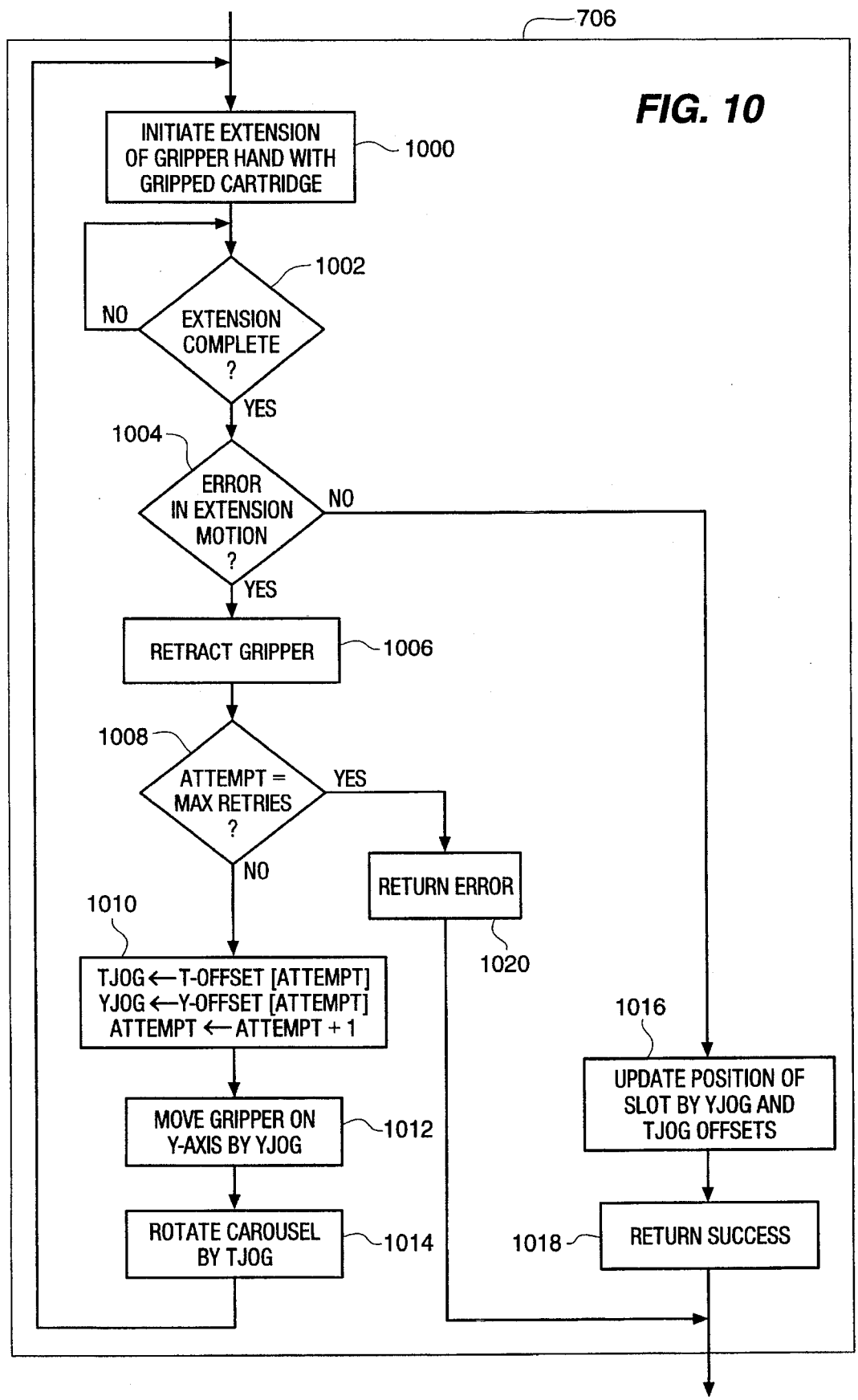
FIG. 10 is a flowchart showing additional detail of an element of the insertion operation of FIG. 7.

FIG. 10 is a flowchart showing additional details of the operation of element 706 of FIG. 7 to insert a cartridge 114, grasped between gripper jaws 208, into a slot of magazine 108. Element 1000 is operable to initiate extension motion of gripper hand 112, (forward—toward magazine 108), by control of servo motor 204. Element 1002 is next operable to loop (wait) until the extension motion is completed (either successfully fully extended, or stopped due to blockage). Element 1004 is then operable to determine whether extension motion of the gripper hand 112 completed due to successful complete extension (thereby successfully inserting the cartridge 114 into its assigned slot of magazine 108) or rather due to premature stoppage caused by misalignment of the gripper hand 112 and the slot in magazine 108. If the extension motion completed successfully, then the extension motion of the gripper hand 112 is completed and processing continues with element 1016 (also labelled "A"). If the extension motion completed due to an error in the servo controlled motion, then processing continues with element 1006.

Element 1006 is operable to retract gripper hand 112 in response to an error in the extension motion of gripper hand 112. Element 1008 is next operable to determine whether this gripper hand 112 extension attempt has exhausted the maximum number of retries permitted by the methods of the present invention. If the maximum number of retries have been exhausted, then processing is completed, the cartridge 114 cannot be returned to its assigned slot in magazine 108, and an error condition is returned by operation of element 1020. One of ordinary skill will recognize that many standard error recovery procedures may be utilized to resolve the error condition. For example, an operator may be notified that the magazine 108 should be manually realigned within the magazine supports 116 on carousel 106. Alternatively, the cartridge 114 may be inserted into another available slot in another magazine 108. Additionally, one will readily recognize that any number of retries suitable to a particular environment may be used in the methods of the present invention.

If the maximum number of retries have not yet been exhausted, processing continues with element 1010. Element 1010 retrieves a theta-axis (carousel rotation) offset and a Y-axis offset to adjust the relative positions of the gripper hand 112 and the desired slot of magazine 108. Each retry attempt adjusts the relative alignments of the gripper hand 112 and the slot of magazine 108 in preparation for another attempt to insert the cartridge 114 into the desired slot. The offset to be used for each axis, for each attempt, may be encoded into parallel arrays (yoffset for the vertical offset and toffset for the theta (rotational) offset) indexed by the attempt (retry) number. One of ordinary skill will recognize many equivalent software coding or data structures in which the desired offsets may be encoded as a function of the attempt number. Element 1010 also increments the attempt number to indicate that another attempt (retry) has been performed.

Elements 1012 and 1014 are next operable to move gripper hand 112 vertically on Y-axis support 120 and to rotate carousel 106. The Y-axis offset to be moved for this retry attempt, vertically up or down, is determined by the value in the yoffset array as discussed above. The theta-axis (rotational) offset to be applied to the carousel for this retry attempt, clockwise or counterclockwise, is determined by the toffset array as discussed above. Exemplary values for the yoffset and toffset parallel tables are discussed below. Processing then continues by looping back to element 1000 to retry the extension of the gripper hand 112 for inserting cartridge 114 into its slot in magazine 108. Looping through elements 1000 through 1014 continues until a retry attempt succeeds in insertion of the cartridge into its slot, as determined by operation of element 1004, or until a maximum number of retries have been attempted, as determined by operation of element 1008.

Element 1016 (also labelled "A") is operable in response to success in the extension motion of gripper hand 112 to insert the cartridge 114 into its slot. Element 1016 stores, in a memory associated with the control electronics, the Y-axis offset and theta-axis offset used to align the gripper hand 112 with the desired slot in magazine 108 for successful insertion of cartridge 114. These stored offsets for the desired slot are applied to subsequent positioning of the gripper hand 112 and carousel 106 for access to the same slot. Element 1018 then completes processing for the insertion operation and returns a success status.

Figure 11:
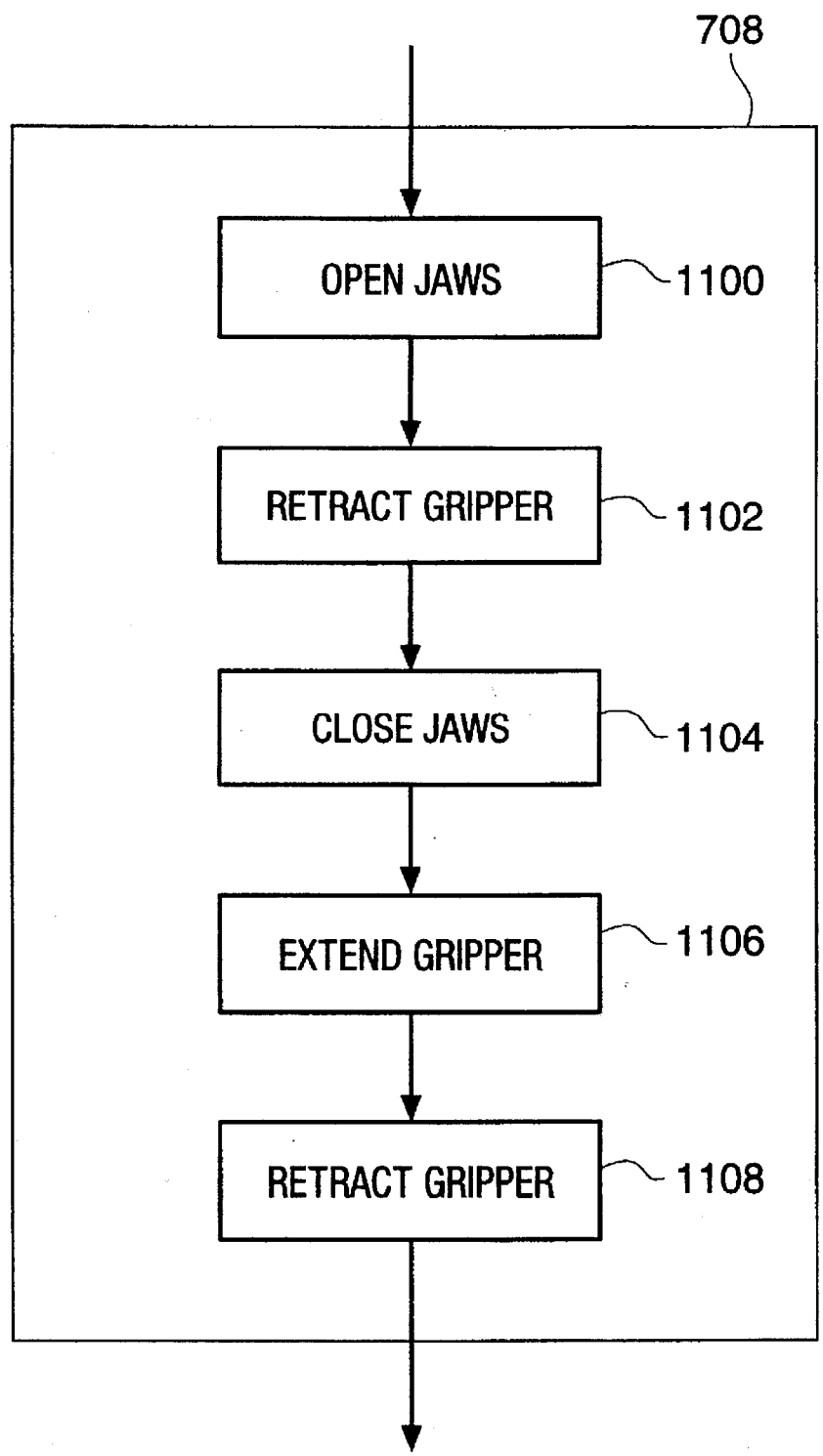
FIG. 11 is a flowchart showing additional detail of an element of the insertion operation of FIG. 7.

FIG. 11 is a flowchart showing additional detail of the operation of element 708 of FIG. 7. Element 708 is operable to seat the inserted cartridge 114 into its slot so as to activate the retention mechanism of the magazine 108 as taught by Schneider et al. (supra.). Retention means in each slot is activated by pushing the cartridge 114 further into its slot against a spring actuated mechanism, then releasing the cartridge to activate the retention means thereby securing the cartridge in its slot.

Following insertion of the cartridge 114 into its slot, element 1100 is operable to open gripper jaws 208 by activation of solenoids 206 to separate the gripper jaws 208 from one another. Element 1102 is next operable to retract the gripper hand 112 rearward (away from the magazine 108) to clear the cartridges released in its slot. Element 1104 then closes gripper jaws 208 by deactivating solenoids 206. The gripper hand 112 with closed jaws 208 is then extended forward (toward the magazine 108 and inserted cartridge 114) by operation of element 1106. The closed gripper jaws 208 engage the front surface of the inserted cartridge 114 to press it deeper into its slot thereby activating the retention means in the slot of the magazine 108. Element 1108 is then operable to retract the gripper hand 112, leaving the inserted cartridge 112 in its slot with the retention means activated to secure the cartridge in it slot.

ADAPTATION METHODS AND TABLES:

Methods of the present invention discussed above attempt to resolve mechanical misalignment between the gripper hand 112 and slots in a magazine 108 by retrying a retraction or insertion operation with theta-axis and/or Y-axis offsets applied to the nominal position of a slot. Offset values which result in a successful retraction or insertion operation are stored in a table for use in subsequent retraction and insertion operations (see elements 926 of FIG. 9 and element 1016 of FIG. 10 discussed above). In this manner the methods of the present invention adapt to mechanical misalignments caused either by manufacturing tolerances or by manual operations involving the insertion of magazines into the library subsystem.

The retry attempts in retraction operations described above with respect to element 610 of FIG. 9 increment the theta-adjust value (element 918) or y-adjust value (element 922) on each retry attempt to free the cartridge from snagging in a retract operation. The retract operation stores the adjust values which resulted in the successful retraction for future retraction or insertion operations (element 926).

The retry attempts in insertion operations described above with respect to element 706 of FIG. 10 attempt various offsets vertically on the Y-axis and/or rotationally on the theta-axis. The retry attempts preferably follow a pattern of offsets on each attempt. The Y-axis and theta-axis offsets for each retry attempt can be shown in the following table of parallel arrays indexed by the retry attempt number:

| Attempt Number | Y-offset | T-offset |
| --- | --- | --- |
| 0 | 0 | 0 |
| 1 | 0 | 10 |
| 2 | 5 | 10 |
| 3 | 5 | 0 |
| 4 | 5 | −10 |
| 5 | 0 | −10 |
| 6 | −5 | −10 |
| 7 | −5 | 0 |
| 8 | −5 | 10 |
| 9 | 0 | 0 |

Figure 13:
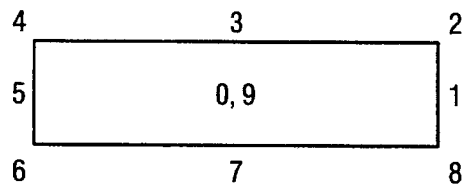
FIG. 13 is a diagram of the offset directions preferred when retrying insert operations to adapt to mechanical misalignments of the gripper hand with the magazine slots.

FIG. 13 shows a front view of the outline of a slot in a magazine 108. The numbers 0–9 on FIG. 13 show graphically the direction of vertical and theta offset movements corresponding to each of the above attempt number relative to attempt number 0, the nominal centered position for inserting a cartridge 114 into the slot. For example, attempt number 1 is shown graphically offset to the right in FIG. 13 corresponding to the entry in the table above indicating that attempt number one is not offset vertically, but is offset on the theta axis by a positive 10 units. Likewise, attempt number 6 is graphically depicted in FIG. 13 offset down and to the left. This offset direction of attempt number 6 corresponds to the above table wherein attempt number 6 is offset vertically down 5 units, and offset on the theta axis by negative 10 (−10) units. One of ordinary skill in the art will readily recognize many equivalent variations to the sequence of retry attempt offsets described in the table above and depicted in FIG. 13.

A data structure is maintained in RAM 1204 (of FIG. 12) which stores information regarding each slot in each magazine in the library. Information regarding each cartridge includes a label, a Y-axis nominal position, a Y-axis offset, a theta-axis nominal position, and a theta-axis offset. The table stored in RAM 1204 may be structured as follows (exemplary values depicted):

| Mag/Slot | Y Position | Y Offset | T Position | T Offset |
| --- | --- | --- | --- | --- |
| 0/0 | 600 | 0 | 500 | 0 |
| 0/1 | 500 | 0 | 500 | 0 |
| 0/2 | 400 | 1 | 500 | 0 |
| 0/3 | 300 | 1 | 500 | 0 |
| 0/4 | 200 | 2 | 500 | 0 |
| 0/5 | 100 | 2 | 500 | 0 |
| 0/6 | 0 | 2 | 500 | 0 |
| 1/0 | 600 | 0 | 5500 | 2 |
| 1/1 | 500 | 0 | 5500 | 2 |
| 1/2 | 400 | 0 | 5500 | 2 |
| 1/3 | 300 | 0 | 5500 | 2 |
| 1/4 | 200 | 0 | 5500 | 2 |
| 1/5 | 100 | 0 | 5500 | 2 |
| 1/6 | 0 | 0 | 5500 | 2 |
| 2/0 | 600 | 1 | 10500 | −1 |
| 2/1 | 500 | 1 | 10500 | −1 |
| 2/2 | 400 | 0 | 10500 | −1 |
| 2/3 | 300 | −1 | 10500 | −1 |
| 2/4 | 200 | −1 | 10500 | −1 |
| 2/5 | 100 | −1 | 10500 | −1 |
| 2/6 | 0 | −2 | 10500 | −1 |
| 3/0 | 600 | 0 | 15500 | 0 |
| 3/1 | 500 | 0 | 15500 | 0 |
| 3/2 | 400 | 0 | 15500 | 0 |
| 3/3 | 300 | 0 | 15500 | 0 |
| 3/4 | 200 | 0 | 15500 | 0 |
| 3/5 | 100 | 0 | 15500 | 0 |
| 3/6 | 0 | 0 | 15500 | 0 |

Subsequent insertion or retraction operations for a particular slot of a particular magazine moves the gripper hand to the Y position modified by the Y offset value corresponding to the desired slot in the desired magazine and rotates the carousel to the T position modified by the T offset value.

There has been described a novel method and associated apparatus which provides for adapting the alignment of a robotic gripper hand in a storage library subsystem relative to slots for holding media cartridges in removable magazines. It is evident, now that the invention has been fully disclosed, that those skilled in the art may now make numerous uses and modifications of the specific embodiment described without departing from the inventive concepts. For example, other magazine designs, removable or fixed, may be utilized, or other geometric arrangements of the slots in the library subsystem may be useful in the library subsystem. Or for example, other drive mechanisms may be employed to move the various robotic mechanisms or even other robotic mechanisms which perform similar functions to grip media cartridges and sense certain failure modes in moving the media cartridges. More particularly, several sequences of retries and associated robotic positioning offset may be employed to adapt the robotic positioning to a particular alignment of a particular slot. Consequently, the invention is to be construed as embracing each and every novel feature and novel combination of features present in and/or possessed by the invention described herein.

What is claimed is:

1. In a storage library subsystem having a rotary carousel with removable magazines with slots for storing media cartridges and having a robotic gripper hand for controllably moving media cartridges within said storage library subsystem, a method for adapting the alignment of said robotic gripper hand with one of said slots to adjust for mechanical misalignments between said gripper hand and said one of said slots comprising the steps of:

(a) receiving a request to insert a media cartridge into a slot of a magazine;
   (b) retrieving said media cartridge into said gripper hand;
   (c) aligning said gripper hand with said slot responsive to receipt of said request to insert;
   (d) extending said gripper hand to insert said media cartridge into said slot;
   (e) detecting a failure of the extension of said gripper hand;
   (f) retracting said gripper hand responsive to detection of said failure;
   (g) incrementally adjusting the alignment between said gripper hand and said slot by a predetermined relative movement of said gripper hand with respect to said slot responsive to detection of said failure;
   (h) repeating steps (d) through (g) responsive to detection of said failure until the extension of said gripper hand succeeds by inserting said media cartridge into said slot; and
   (l) storing adjustment values indicative of adjustments performed by the last repetition of step (g), the stored adjustment values usable to compensate subsequent movement of said gripper hand.

2. The method of claim 1 wherein the adjusting step (g) includes:
   moving said gripper hand vertically up relative to said slot a predetermined vertical offset distance to align said gripper hand with said slot.

3. The method of claim 2 further comprising the step of:
   storing said vertical offset in a memory in said storage library subsystem and associated with said slot responsive to the extension of said gripper hand succeeding by inserting said media cartridge into said slot, and
   wherein the aligning step (c) further includes:
   retrieving said vertical offset previously stored in said memory; and
   moving said gripper hand vertically a distance corresponding to said vertical offset retrieved from said memory.

4. The method of claim 1 wherein the adjusting step (g) includes:
   moving said gripper hand vertically down relative to said slot by a predetermined vertical offset distance to align said gripper hand with said slot.

5. The method of claim 4 further comprising the step of:
   storing said vertical offset in a memory in said storage library subsystem and associated with said slot responsive to the extension of said gripper hand succeeding by inserting said media cartridge into said slot, and
   wherein the aligning step (c) further includes:
   retrieving said vertical offset previously stored in said memory; and
   moving said gripper hand vertically a distance corresponding to said vertical offset retrieved from said memory.

6. The method of claim 1 wherein said slots are positioned around the circumference of a rotatable carousel and wherein the adjusting step (g) includes:
   rotating said rotatable carousel clockwise by a predetermined theta offset distance to align said gripper hand with said slot.

7. The method of claim 6 further comprising the step of:
   storing said theta offset in a memory in said storage library subsystem and associated with said slot responsive to the extension of said gripper hand succeeding by inserting said media cartridge into said slot, and
   wherein the aligning step (c) further includes:
   retrieving said theta offset previously stored in said memory; and
   rotating said rotatable carousel clockwise a distance corresponding to said theta offset retrieved from said memory.

8. The method of claim 1 wherein said slots are positioned around the circumference of a rotatable carousel and wherein the adjusting step (g) includes:
   rotating said rotatable carousel counterclockwise by a predetermined theta offset distance to align said gripper hand with said slot.

9. The method of claim 6 further comprising the step of:
   storing said theta offset in a memory in said storage library subsystem and associated with said slot responsive to the extension of said gripper hand succeeding by inserting said media cartridge into said slot, and
   wherein the aligning step (c) further includes:
   retrieving said theta offset previously stored in said memory; and
   rotating said rotatable carousel counterclockwise a distance corresponding to said theta offset retrieved from said memory.

10. In a storage library subsystem having a rotary carousel with removable magazines with slots for storing media cartridges and having a robotic gripper hand for controllably moving media cartridges within said storage library subsystem, a method for adapting the alignment of said robotic gripper hand with one of said slots to adjust for mechanical misalignments between said gripper hand and said one of said slots comprising the steps of:

(a) receiving a request to retract a media cartridge from a slot of a magazine;
   (b) aligning said gripper hand with said slot responsive to receipt of said request to retract;
   (c) extending said gripper hand to grasp said media cartridge;
   (d) retracting said gripper hand from said slot with said media cartridge;
   (e) detecting a loss of contact between said gripper hand and said media cartridge;
   (f) incrementally adjusting the alignment between said gripper hand and said slot by a predetermined relative movement of said gripper hand with respect to said slot responsive to detection of said loss of contact;
   (g) repeating steps (c) through (f) responsive to detection of said loss of contact until the retraction of said gripper hand with said media cartridge succeeds by retracting said media cartridge from said slot; and (h) storing adjustment values indicative of adjustments performed by the last repetition of step (f), the stored adjustment values usable to compensate subsequent movement of said gripper hand.

11. The method of claim 10 wherein the adjusting step (f) includes:

moving said gripper hand vertically up relative to said slot a predetermined vertical offset distance to align said gripper hand with said slot.

12. The method of claim 11 further comprising the step of:

storing said vertical offset in a memory in said storage library subsystem and associated with said slot responsive to the extension of said gripper hand succeeding by retracting said media cartridge from said slot, and wherein the aligning step (b) further includes:

retrieving said vertical offset previously stored in said memory; and moving said gripper hand vertically a distance corresponding to said vertical offset retrieved from said memory.

13. The method of claim 10 wherein the adjusting step (f) includes:

moving said gripper hand vertically down relative to said slot by a predetermined vertical offset distance to align said gripper hand with said slot.

14. The method of claim 13 further comprising the step of:

storing said vertical offset in a memory in said storage library subsystem and associated with said slot responsive to the extension of said gripper hand succeeding by retracting said media cartridge from said slot, and wherein the aligning step (b) further includes:

retrieving said vertical offset previously stored in said memory; and moving said gripper hand vertically a distance corresponding to said vertical offset retrieved from said memory.

15. The method of claim 10 wherein said slots are positioned around the circumference of a rotatable carousel and wherein the adjusting step (f) includes:

rotating said rotatable carousel clockwise by a predetermined theta offset distance to align said gripper hand with said slot.

16. The method of claim 15 further comprising the step of:

storing said theta offset in a memory in said storage library subsystem and associated with said slot responsive to the extension of said gripper hand succeeding by retracting said media cartridge from said slot, and wherein the aligning step (b) further includes:

retrieving said theta offset previously stored in said memory; and rotating said rotatable carousel clockwise a distance corresponding to said theta offset retrieved from said memory.

17. The method of claim 10 wherein said slots are positioned around the circumference of a rotatable carousel and wherein the adjusting step (f) includes:

rotating said rotatable carousel counterclockwise by a predetermined theta offset distance to align said gripper hand with said slot.

18. The method of claim 17 further comprising the step of:

storing said theta offset in a memory in said storage library subsystem and associated with said slot responsive to the extension of said gripper hand succeeding by retracting said media cartridge from said slot, and wherein the aligning step (b) further includes:

retrieving said theta offset previously stored in said memory; and rotating said rotatable carousel counterclockwise a distance corresponding to said theta offset retrieved from said memory.

19. A method for adapting the alignment of a robotic gripper hand, controllably operable for manipulating storage media cartridges, within a storage library subsystem having a rotary carousel with a removeable magazine comprising the steps of:

detecting a failure in motion of said robotic gripper hand within said storage library subsystem due to misalignment of said robotic gripper hand with a slot in a moveable magazine in said storage library subsystem;

repetitively adjusting the alignment of said robotic gripper hand, in response to detection of said failure in motion, to eliminate said failure in motion due to misalignment of said robotic gripper hand with a slot in a moveable magazine in said storage library/subsystem;

storing, responsive to the adjusting step, adjustment values indicative of adjustments to said alignment of said robotic gripper hand; and applying said adjustment values to subsequent motion of said robotic gripper hand to adapt said subsequent motion to eliminate said misalignment.

20. The method of claim 19 wherein said robotic gripper hand is moveable vertically up and down with respect to said storage media cartridges, the adjusting step including the step of:

moving said robotic gripper hand vertically to eliminate said failure in motion due to misalignment of said robotic gripper hand.

21. The method of claim 19 wherein said storage media cartridges are rotatably moveable relative to said robotic gripper hand, the adjusting step including the step of:

rotating said storage media cartridges to eliminate said failure in motion due to misalignment of said robotic gripper hand.

* * * * *